(12) United States Patent
Shibata et al.

(10) Patent No.: US 10,730,981 B2
(45) Date of Patent: Aug. 4, 2020

(54) THERMOPLASTIC RESIN COMPOSITION, MANUFACTURING METHOD OF THERMOPLASTIC RESIN COMPOSITION, MOLDED PRODUCT AND MANUFACTURING METHOD OF MOLDED PRODUCT

(71) Applicant: Toray Industries, Inc., Tokyo (JP)

(72) Inventors: Takuya Shibata, Ichihara (JP); Taku Araki, Ichihara (JP); Takayuki Hase, Ichihara (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 16/617,953

(22) PCT Filed: Mar. 23, 2018

(86) PCT No.: PCT/JP2018/011706
§ 371 (c)(1),
(2) Date: Nov. 27, 2019

(87) PCT Pub. No.: WO2018/220961
PCT Pub. Date: Dec. 6, 2018

(65) Prior Publication Data
US 2020/0115479 A1   Apr. 16, 2020

(30) Foreign Application Priority Data

Jun. 1, 2017  (JP) .................. 2017-109214

(51) Int. Cl.
| | | |
|---|---|---|
| *C08L 33/12* | (2006.01) | |
| *C08L 51/04* | (2006.01) | |
| *C08F 220/14* | (2006.01) | |
| *C08F 279/02* | (2006.01) | |
| *C08J 3/00* | (2006.01) | |

(52) U.S. Cl.
CPC .......... *C08F 220/14* (2013.01); *C08F 279/02* (2013.01); *C08J 3/005* (2013.01); *C08L 33/12* (2013.01); *C08L 51/04* (2013.01); *C08J 2333/12* (2013.01); *C08J 2451/04* (2013.01); *C08L 2201/10* (2013.01)

(58) Field of Classification Search
CPC ................................ C08L 33/06; C08L 51/04
See application file for complete search history.

(56) References Cited

U.S. PATENT DOCUMENTS

| | | | | |
|---|---|---|---|---|
| 5,446,096 | A * | 8/1995 | Drzewinski ............. | C08L 33/10 525/189 |
| 2005/0239962 | A1* | 10/2005 | Yoo ........................ | C08F 279/02 525/71 |
| 2009/0269531 | A1* | 10/2009 | Arnould .................. | B32B 25/08 428/36.9 |
| 2018/0030262 | A1* | 2/2018 | Abe ........................ | B29C 66/71 |

FOREIGN PATENT DOCUMENTS

| | | |
|---|---|---|
| JP | 2000-273270 A | 10/2000 |
| JP | 2001-226547 A | 8/2001 |
| JP | 2002-3548 A | 1/2002 |
| JP | 2002-12735 A | 1/2002 |
| JP | 2002-128848 A | 5/2002 |
| JP | 2002-212369 A | 7/2002 |
| JP | 2003-147146 A | 5/2003 |
| JP | 2003-242679 A | 8/2003 |
| JP | 2003-277454 A | 10/2003 |
| JP | 2004-339418 A | 12/2004 |
| JP | 2005-343946 A | 12/2005 |
| JP | 2010-116427 A | 5/2010 |
| JP | 2014-181315 A | 9/2014 |

* cited by examiner

*Primary Examiner* — Jeffrey C Mullis
(74) *Attorney, Agent, or Firm* — DLA Piper LLP (US)

(57) ABSTRACT

A thermoplastic resin composition includes a graft copolymer (A) obtained by graft copolymerization of a monomer mixture (a) that includes at least an aromatic vinyl monomer (a1) and a (meth)acrylate monomer (a2), but does not practically contain a vinyl cyanide monomer (a3), in the presence of a rubbery polymer (r) having a refractive index of not lower than 1.510 and not higher than 1.520; and a vinyl copolymer (B). An acetone insoluble component (C) of the thermoplastic resin composition does not practically contain a vinyl cyanide monomer-derived unit. An acetone soluble component (D) of the thermoplastic resin composition contains the vinyl cyanide monomer-derived unit. The content of the vinyl cyanide monomer-derived unit is not lower than 2% by mass and not higher than 20% by mass relative to 100% by mass of the acetone soluble component (D).

14 Claims, 3 Drawing Sheets

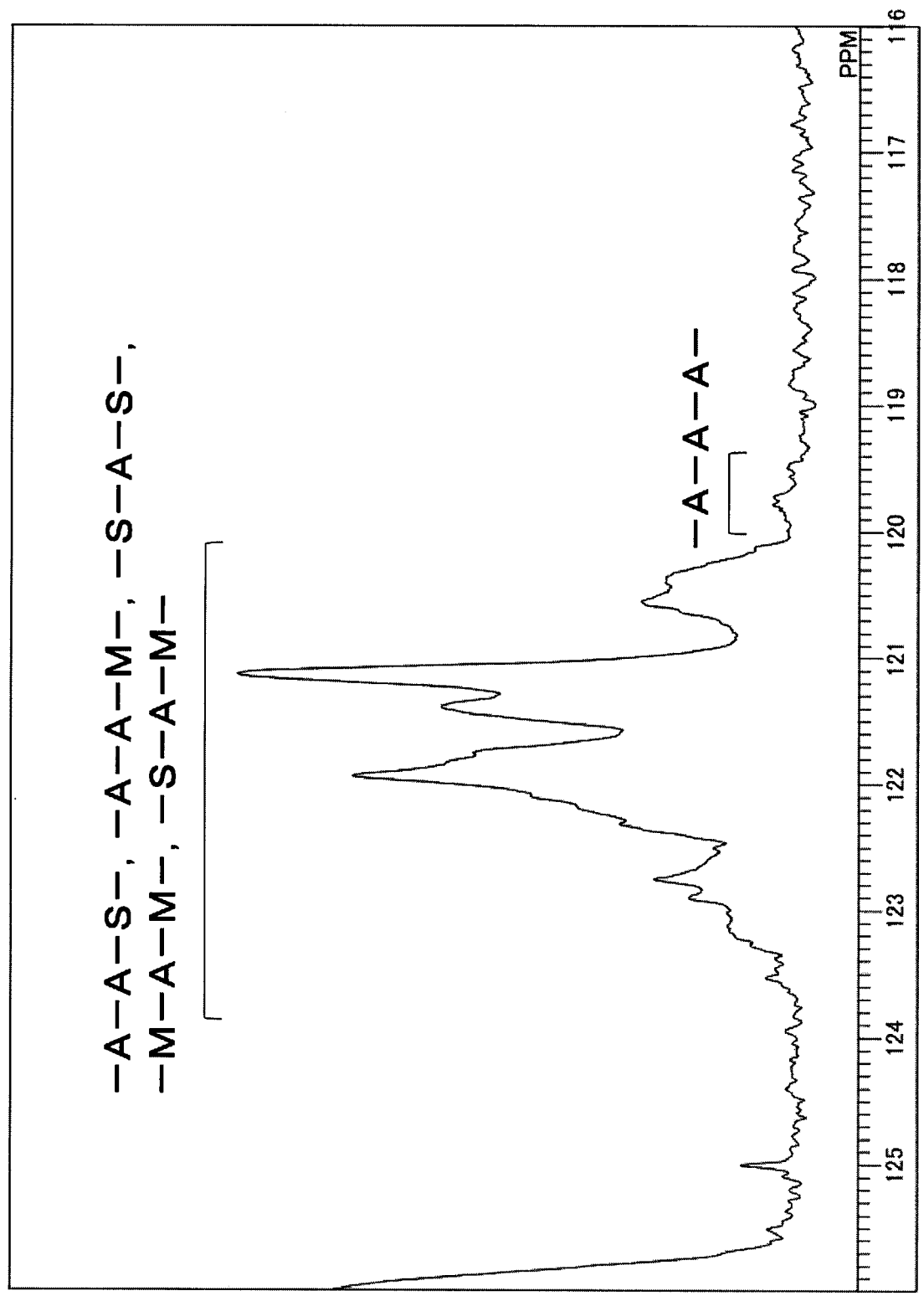

THERMOPLASTIC RESIN COMPOSITION, MANUFACTURING METHOD OF THERMOPLASTIC RESIN COMPOSITION, MOLDED PRODUCT AND MANUFACTURING METHOD OF MOLDED PRODUCT

CROSS REFERENCE TO RELATED APPLICATION

This application claims priority from Japanese patent application 2017-109214 filed on Jun. 1, 2017, the entirety of the disclosure of which is hereby incorporated by reference into this application.

TECHNICAL FIELD

This disclosure relates to a thermoplastic resin composition.

BACKGROUND

A known transparent ABS resin is obtained by containing a graft copolymer obtained by copolymerization of rubbery polymer such as a diene rubber with (i) an aromatic vinyl compound such as styrene or α-methyl styrene, (ii) a vinyl cyanide compound such as acrylonitrile or methacrylonitrile, and (iii) an unsaturated alkyl carboxylate compound such as methyl methacrylate or methyl acrylate (as described in, for example, JP 2002-128848 A). This transparent ABS resin has good (i) transparency, (ii) mechanical strength balance such as impact resistance and rigidity, moldability and cost performance and is widely used for applications such as household electric appliances, communication equipment and general merchandises.

The following methods have been proposed as techniques of providing the transparency of the transparent ABS resin. For example, JP 2002-128848 A and JP 2003-277454 A propose methods that cause a difference in refractive index between an acetone insoluble component and an acetone soluble component of rubber-reinforced styrene resin to be less than 0.02. JP 2002-3548 A proposes a method that uses polybutadiene rubber, adjusts the refractive index of an acetone soluble component of a butadiene rubber-reinforced resin to 1.514 to 1.520, and causes a difference in refractive index between the acetone soluble component and an acetone insoluble component to be equal to or less than 0.006. JP 2002-212369 A proposes a method that adjusts a difference in refractive index between a rubbery polymer component and an acetone soluble component of a thermoplastic resin composition to be equal to or less than 0.03 and causes a difference in refractive index between the rubbery polymer and a graft component to be equal to or less than 0.03.

As a technique of providing the further higher transparency, JP 2014-181315 A proposes a method that specifies the transmittance at a wavelength of 700 nm and the transmittance at a wavelength of 450 nm by a spectrophotometer.

As a technique of improving the color tone of the transparent ABS resin, on the other hand, JP 2005-343946 A proposes a method that adds water to a graft copolymer (B) from a graft copolymer (B) feed conveyance unit in the process of manufacturing a vinyl (co)polymer (A) by continuous bulk polymerization or continuous solution polymerization of a vinyl monomer (a), subsequently supplying the graft copolymer (B) dehydrated and dried in advance from a side feeder to the vinyl (co)polymer in a molten state, and melt kneading the mixture to continuously manufacture a thermoplastic resin composition.

The above techniques, however, result in insufficient improvement of the transparency and the color tone. Accordingly, there are such problems that applications of the transparent ABS resin are limited and that molded products of the transparent ABS resin are darkened by bluing color toning.

It could therefore be helpful to provide a thermoplastic resin composition having significantly high transparency and good color tone, as well as excellent impact resistance.

SUMMARY

We found that preparation of a thermoplastic resin composition where a rubbery polymer-containing graft copolymer is dispersed in a vinyl copolymer obtained by copolymerization of a vinyl monomer mixture, under specific conditions provides a thermoplastic resin composition having significantly high transparency and good color tone, as well as excellent impact resistance.

We thus provide:

(1) A thermoplastic resin composition comprises a graft copolymer (A) obtained by graft copolymerization of a monomer mixture (a) that includes at least an aromatic vinyl monomer (a1) and a (meth)acrylate monomer (a2) but does not practically contain a vinyl cyanide monomer (a3), in the presence of a rubbery polymer (r) having a refractive index of not lower than 1.510 and not higher than 1.520; and a vinyl copolymer (B) obtained by copolymerization of a monomer mixture (b) that includes at least an aromatic vinyl monomer (b1), a (meth)acrylate monomer (b2), and a vinyl cyanide monomer (b3). An acetone insoluble component (C) of the thermoplastic resin composition does not practically contain a vinyl cyanide monomer-derived unit. An acetone soluble component (D) of the thermoplastic resin composition contains the vinyl cyanide monomer-derived unit. A content of the vinyl cyanide monomer-derived unit is not lower than 2% by mass and not higher than 20% by mass relative to 100% by mass of the acetone soluble component (D).

(2) In the thermoplastic resin composition described in (1) above, a dimethyl sulfoxide soluble component (E) of the thermoplastic resin composition may contain the vinyl cyanide monomer-derived unit. In the dimethyl sulfoxide soluble component (E), a rate of a triad having all positions occupied by the vinyl cyanide monomer-derived unit to a total number of triads having a center position occupied by the vinyl cyanide monomer-device unit may be lower than 1%.

(3) In the thermoplastic resin composition described in either (1) or (2) above, the rubbery polymer (r) may be polybutadiene.

(4) In the thermoplastic resin composition according to any one of (1) to (3) above, the rubbery polymer (r) may have a mass average particle size of not less than 0.15 μm and not greater than 0.4 μm.

(5) A manufacturing method of a thermoplastic resin composition comprises a process of obtaining a graft copolymer (A) by graft copolymerization of a monomer mixture (a) that includes at least an aromatic vinyl monomer (a1) and a (meth)acrylate monomer (a2) but does not practically contain a vinyl cyanide monomer (a3), in the presence of a rubbery polymer (r) having a refractive index of not lower than 1.510 and not higher than 1.520; a process of obtaining a vinyl copolymer (B) by copolymerization of a monomer mixture (b) that includes at least an aromatic vinyl monomer (b1), a (meth)acrylate monomer (b2), and a vinyl cyanide monomer (b3); and a process of blending the graft copolymer (A) with the vinyl copolymer (B). An acetone insoluble component (C) of the thermoplastic resin composition does not practically contain a vinyl cyanide monomer-derived unit. An acetone soluble component (D) of the thermoplastic resin composition contains the vinyl cyanide monomer-derived unit. A content of the vinyl cyanide monomer-derived unit is not lower than 2% by mass and not higher than 20% by mass relative to 100% by mass of the acetone soluble component (D).

(6) In the manufacturing method of the thermoplastic resin composition described in (5) above, a dimethyl sulfoxide soluble component (E) of the thermoplastic resin composition may contain the vinyl cyanide monomer-derived unit. In the dimethyl sulfoxide soluble component (E), a rate of a triad having all positions occupied by the vinyl cyanide monomer-derived unit to a total number of triads having a center position occupied by the vinyl cyanide monomer-device unit may be lower than 1%.

(7) In the manufacturing method of the thermoplastic resin composition described in either (5) or (6) above, the graft copolymer (A) may be manufactured by an emulsion polymerization method.

(8) In the manufacturing method of the thermoplastic resin composition described in any one of (5) to (7) above, the vinyl copolymer (B) may be manufactured by a continuous bulk polymerization method or by a continuous solution polymerization method.

(9) A molded product is obtained by molding the thermoplastic resin composition described in any one of (1) to (4) above.

(10) A manufacturing method of a molded product comprises the manufacturing method of the thermoplastic resin composition described in any one of (5) to (8) above; and a process of molding the thermoplastic resin composition provides a molded product.

We thus provide a thermoplastic resin composition having significantly high transparency and good color tone, as well as excellent impact resistance.

BRIEF DESCRIPTION OF THE DRAWINGS

FIG. 3 is a diagram illustrating one example of an enlarged view of C≡N carbon in the $^{13}$C-NMR spectral chart of the styrene/methyl methacrylate/acrylonitrile copolymer.

REFERENCE SIGNS LIST

Figure 1:
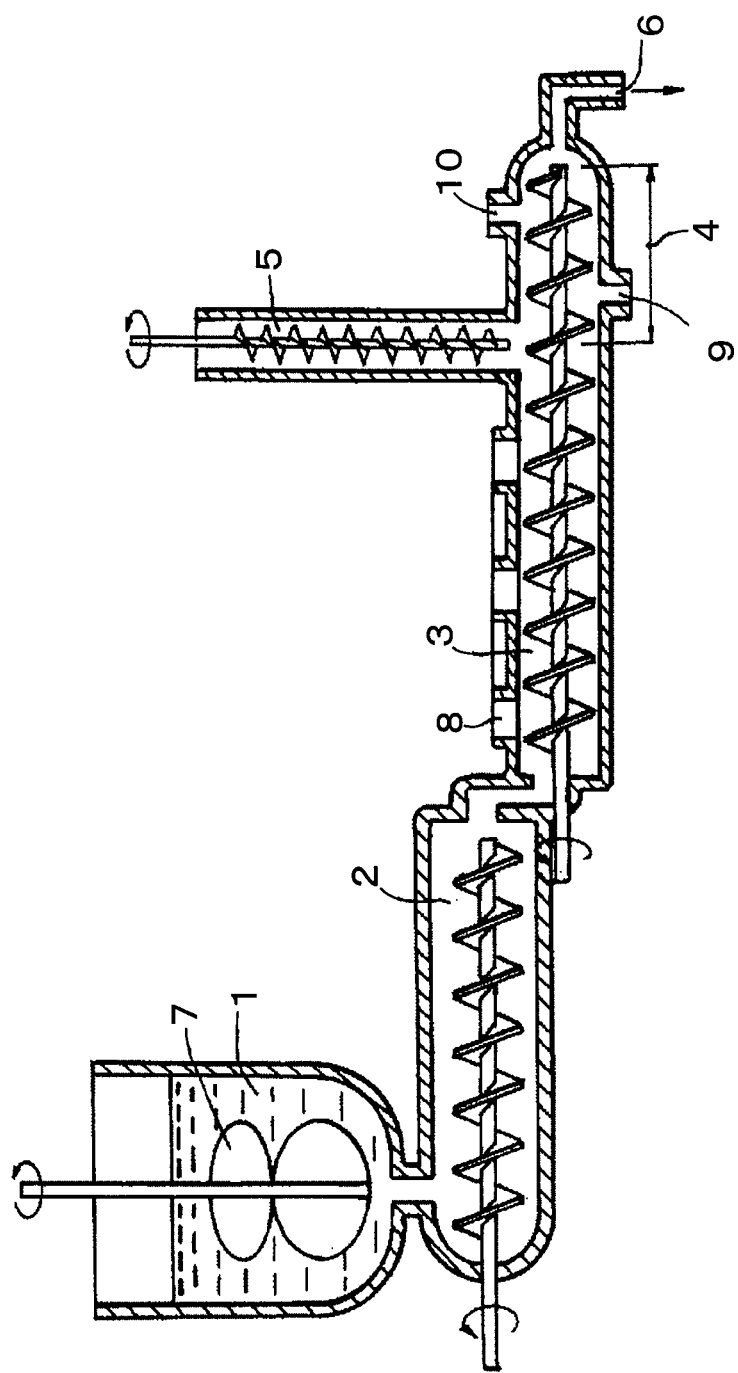
FIG. 1 is a schematic diagram illustrating a manufacturing device of a thermoplastic resin composition according to one example.

1 . . . reaction tank, 2 . . . preheater, 3 . . . twin screw extruder-type monomer removal machine, 4 . . . melt kneading zone, 5 . . . twin screw extruder-type feeder, 6 . . . discharge opening, 7 . . . stirrer (helical ribbon impeller), 8 . . . vent hole, 9 . . . water inlet, 10 . . . final vent hole

DETAILED DESCRIPTION

Our thermoplastic resin composition is obtained by blending a graft copolymer (A) described later with a vinyl copolymer (B) described later. Mixing the graft copolymer (A) enhances the moldability of the thermoplastic resin composition and improves the impact resistance, the transparency and the color tone of a molded product. Blending the vinyl copolymer (B) enhances the moldability of the thermoplastic resin composition and improves the transparency and the color tone of the molded product.

The graft copolymer (A) that constitutes the thermoplastic resin composition is obtained by graft copolymerization of a monomer mixture (a) that includes at least an aromatic vinyl monomer (a1) and a (meth)acrylate monomer (a2) but does not practically contain a vinyl cyanide monomer (a3), in the presence of a rubbery polymer (r) having a refractive index of not lower than 1.510 and not higher than 1.520. The vinyl monomer mixture (a) may further contain another monomer that is copolymerizable with any of the monomers (a1) to (a3) as described later.

The "vinyl cyanide monomer-derived unit" herein denotes a unit expressed by Chemical Formula (1). The vinyl cyanide monomer-derived unit is a part that is introduced into the copolymer by polymerization of the vinyl cyanide monomer.

(1)

where R denotes a hydrogen atom or an alkyl group.

The expression of "practically not containing the vinyl cyanide monomer-derived unit" means that there is no peak at 2240 cm$^{-1}$ that is attributed to CEN stretch derived from the vinyl cyanide monomer in FT-IR analysis with regard to a film produced by heating and pressurizing the obtained graft copolymer (A) by hot-press set at 230° C. to have a thickness of 30±5 μm.

Available examples of the rubbery polymer (r) include polybutadiene, poly(butadiene—styrene) (SBR), poly(butadiene-butyl acrylate), poly(butadiene-methyl methacrylate), poly(butyl acrylate-methyl methacrylate), poly(butadiene-ethyl acrylate) and natural rubber. Two or more different types of these materials may be used for the rubbery polymer (r). Among these examples of the rubbery polymer (r), polybutadiene, SBR and natural rubber are preferable and polybutadiene is most preferable, in terms of further improving the impact resistance, the transparency and the color tone.

The refractive index of the rubbery polymer (r) is not lower than 1.510 and not higher than 1.520. The refractive index of the rubbery polymer (r) that is lower than 1.510 or higher than 1.520 deteriorates the transparency and the color tone.

The refractive index of the rubbery polymer (r) may be measured by a procedure below. The procedure adds 10 ml of rubber latex in an emulsified state to 150 ml of methanol with stirring at 300 rpm and subsequently adds 20 ml of sulfuric acid that is adjusted to be 10% by mass to obtain precipitate of the rubbery polymer (r). The procedure then dries the obtained precipitate of the rubbery polymer (r) at 60° C. under reduced pressure for five hours and subsequently heats and pressurizes the precipitate of the rubbery polymer (r) by hot press set at 230° C. to produce a film having a thickness of 30±5 μm. The procedure then adds a small amount of 1-bromonaphthalene dropwise to the obtained film as a measurement sample and measures the refractive index of the measurement sample by using an Abbe's refractometer under the conditions that the measurement temperature is 23° C. and that sodium lamp D line is used as a light source. Sodium lamp D line is used as the light source and the measurement temperature is set to 23° C. for measurement of the refractive index using the Abbe's refractometer, unless otherwise specified.

The content of the rubbery polymer (r) is preferably not lower than 20% by mass and not higher than 80% by mass relative to the total amount of the rubbery polymer (r) and the vinyl monomer mixture (a) that constitute the graft copolymer (A). The content of the rubbery polymer (r) that is not lower than 20% by mass further improves the impact resistance of the molded product. The content of the rubbery polymer (r) is more preferably not lower than 35% by mass. The content of the rubbery polymer (r) that is not higher than 80% by mass, on the other hand, further enhances the moldability of the thermoplastic resin composition and improves the impact resistance of the molded product. The content of the rubbery polymer (r) is more preferably not higher than 60% by mass.

The mass average particle size of the rubbery polymer (r) is preferably not smaller than 0.15 μm and is more preferably not smaller than 0.25 μm and is also preferably not larger than 0.4 μm and is more preferably not larger than 0.35 μm. The mass average particle size of the rubbery polymer (r) that is not smaller than 0.15 μm suppresses reduction of the impact resistance of the molded product. The mass average particle size of the rubbery polymer (r) that is not larger than 0.4 μm, on the other hand, suppresses deterioration of the transparency and the color tone of the molded product.

The aromatic vinyl monomer (a1) included in the vinyl monomer mixture (a) may be, for example, styrene, α-methyl styrene, p-methyl styrene, m-methyl styrene, o-methyl styrene, vinyl toluene or t-butyl styrene. Two or more different types of these materials may be contained as the aromatic vinyl monomer (a1). Among these examples of the aromatic vinyl monomer (a1), styrene is preferable, in terms of further enhancing the moldability of the thermoplastic resin composition and improving the transparency and the rigidity of the molded product.

The content of the aromatic vinyl monomer (a1) included in the vinyl monomer mixture (a) is preferably not lower than 5% by mass, is more preferably not lower than 10% by mass and is furthermore preferably not lower than 20% by mass relative to a total of 100% by mass of the vinyl monomer mixture (a), in terms of further enhancing the moldability of the thermoplastic resin composition and improving the rigidity of the molded product. The content of the aromatic vinyl monomer (a1) included in the vinyl monomer mixture (a) is, on the other hand, preferably not higher than 40% by mass, is more preferably not higher than 35% by mass and is furthermore preferably not higher than 30% by mass, in terms of improving the impact resistance and the transparency of the molded product.

The (meth)acrylate monomer (a2) included in the vinyl monomer mixture (a) is preferably, for example, an ester of an alcohol containing one to six carbon atoms and acrylic acid or methacrylic acid. The ester of the alcohol containing one to six carbon atoms and acrylic acid or methacrylic acid may further have a substituent group such as a hydroxyl group or a halogen group. The ester of the alcohol containing one to six carbon atoms and acrylic acid or methacrylic acid may be, for example, methyl (meth)acrylate, ethyl (meth)acrylate, n-propyl (meth)acrylate, n-butyl (meth)acrylate, t-butyl (meth)acrylate, n-hexyl (meth)acrylate, cyclohexyl (meth)acrylate, chloromethyl (meth)acrylate, 3-hydroxypropyl (meth)acrylate, 2,3,4,5,6-pentahydroxyhexyl (meth)acrylate or 2,3,4,5-tetrahydroxypentyl (meth)acrylate. Two or more different types of these materials may be contained as the (meth)acrylate monomer (a2). Among these examples of the (meth)acrylate monomer (a2), methyl (meth)acrylate is preferable, in terms of improving the transparency of the molded product. The expression of "(meth)" herein means either "methacrylic" or "acrylic". For example, "(meth)acrylic acid" means either acrylic acid or methacrylic acid.

The content of the (meth)acrylate monomer (a2) included in the vinyl monomer mixture (a) is preferably not lower than 30% by mass, is more preferably not lower than 50% by mass and is furthermore preferably not lower than 70% by mass relative to the total of 100% by mass of the vinyl monomer mixture (a), in terms of improving the transparency of the molded product. The content of the (meth)acrylate monomer (a2) included in the vinyl monomer mixture (a) is, on the other hand, preferably not higher than 90% by mass, is more preferably not higher than 85% by mass and is furthermore preferably not higher than 80% by mass, in terms of further improving the transparency of the molded product.

The vinyl cyanide monomer (a3) included in the vinyl monomer mixture (a) may be, for example, acrylonitrile, methacrylonitrile or ethacrylonitrile. Two or more different types of these materials may be contained as the vinyl cyanide monomer (a3). Among these examples of the vinyl cyanide monomer (a3), acrylonitrile is preferable, in terms of further improving the impact resistance of the molded product.

The vinyl cyanide monomer (a3) included in the vinyl monomer mixture (a) has substantially no content and preferably has no content at all.

Another monomer that is copolymerizable with at least one of the aromatic vinyl monomer (a1) and the (meth)acrylate monomer (a2) is not specifically limited but may be any vinyl monomer other than the aromatic vinyl monomer (a1), the (meth)acrylate monomer (a2) and the vinyl cyanide monomer (a3) described above as long as this vinyl monomer does not damage the advantageous effects. This another monomer may be, for example, an unsaturated fatty acid, an acrylamide monomer or a maleimide monomer. Two or more different types of these materials may be contained as this another monomer.

Examples of the unsaturated fatty acid include itaconic acid, maleic acid, fumaric acid, butanoic acid, acrylic acid and methacrylic acid. Examples of the acrylamide monomer include acrylamide, methacrylamide, and N-methylacrylamide. Examples of the maleimide monomer include N-methylmaleimide, N-ethylmaleimide, N-isopropylmaleimide, N-butylmaleimide, N-hexylmaleimide, N-octylmaleimide, N-dodecylmaleimide, N-cyclohexylmaleimide and N-phenylmaleimide.

The number average molecular weight of an acetone soluble component of the graft copolymer (A) is not specifically limited but is preferably not less than 30,000 and is more preferably not less than 35,000. The number average molecular weight of the acetone soluble component of the graft copolymer (A) that is not less than 30,000 further improves the impact resistance of the molded product. The number average molecular weight of the acetone soluble component of the graft copolymer (A) is, on the other hand, preferably not greater than 60,000 and is more preferably not greater than 50,000. The number average molecular weight of the acetone soluble component of the graft copolymer (A)

that is not greater than 60,000 further enhances the moldability of the thermoplastic resin composition.

The number average molecular weight of the acetone soluble component of the graft copolymer (A) may be determined by conversion from GPC chromatogram measurement of a solution of about 0.2% by mass that is prepared by dissolving about 0.03 g of an acetone soluble component collected by concentrating a filtrate after filtration of an acetone insoluble component from the graft copolymer (A) by a rotary evaporator in about 15 g of tetrahydrofuran, by using poly(methyl methacrylate) as a standard material. The conditions of the GPC measurement are as follows:
measurement device: Waters 2695
column temperature: 40° C.
detector: RI2414 (differential refractive index detector)
flow rate of carrier eluent: 0.3 ml/minute (solvent: tetrahydrofuran)
columns: TSK gel Super HZM-M (6.0 mm I.D.×15 cm) and TSK gel Super HZM-N (6.0 mm I.D.×15 cm) arranged in series (both manufactured by TOSOH Corporation).

The graft ratio of the graft copolymer (A) is not specifically limited but is preferably not lower than 10% and not higher than 100%, in terms of improving the impact resistance of the molded product.

The graft ratio of the graft copolymer (A) may be determined by a procedure below. The procedure first adds 80 ml of acetone to about 1 g of the graft copolymer (A) and refluxes the solution in a hot water bath at 70° C. for 3 hours. The procedure subsequently centrifuges this solution at 8000 rpm (10000 G) for 40 minutes and then filters an insoluble substance to obtain an acetone insoluble component. The procedure dries the obtained acetone insoluble component under reduced pressure at 80° C. for 5 hours, subsequently measures the mass (expressed by n in an expression below) of the dried acetone insoluble component and calculates the graft ratio by the following expression:

$$\text{graft ratio}(\%) = \{[(n)-((m) \times X/100)]/[(m) \times X/100]\} \times 100$$

where m denotes the sample mass of the graft copolymer (A) used, and X denotes the content of the rubbery polymer (% by mass) of the graft copolymer (A).

A difference in refractive index between the graft component (acetone insoluble component) of the graft copolymer (A) and the rubbery polymer (r) is preferably not higher than 0.03 and is more preferably not higher than 0.01. The difference in refractive index between the graft component (acetone insoluble component) of the graft copolymer (A) and the rubbery polymer (r) that is not higher than 0.03 improves the transparency and the color tone of the molded product.

The refractive index of the graft component of the graft copolymer (A) mainly depends on the composition of the vinyl monomers used as the raw materials. The refractive index can thus be in a desired range by appropriately selecting the types and the composition ratio of the vinyl monomers. Especially, when the polymer conversion rate is equal to or higher than 95% by the emulsion polymerization method, the composition of the graft component becomes substantially equivalent to the composition of the vinyl monomer mixture (a).

The refractive index of the graft component of the graft copolymer (A) may be estimated from the refractive indexes and the contents of the vinyl monomers. For example, in a styrene/methyl methacrylate copolymer, the refractive index of the graft component of the graft copolymer (A) may be estimated by an expression:

$$nD(G) = (1.595 \times MS/100) + (1.490 \times MM/100)$$

where nD(G) denotes the refractive index of the graft component of the graft copolymer (A), MS denotes the content of styrene (% by mass), MM denotes the content of methyl methacrylate (% by mass), 1.595 is the refractive index of polystyrene, and 1.490 is the refractive index of poly(methyl methacrylate). The refractive indexes of polystyrene and poly(methyl methacrylate) may be measured by an Abbe's refractometer.

The refractive index of the graft component of the graft copolymer (A) may be determined by measuring the refractive index of a graft component that is obtained by dissolving the graft copolymer (A) in acetone and drying a residue after filtration of an acetone soluble component, by an Abbe's refractometer.

The manufacturing method of the graft copolymer (A) is more preferably the emulsion polymerization method since the emulsion polymerization method can readily adjust the particle size of the rubbery polymer (r) to a desired range and can also readily control the polymerization stability by heat removal during polymerization.

In manufacturing the graft copolymer (A) by the emulsion polymerization method, a method of supplying the rubbery polymer (r) and the vinyl monomer mixture (a) is not specifically limited. For example, all these materials may be collectively supplied at an initial stage. With a view to controlling the distribution of the copolymer composition, part of the vinyl monomer mixture (a) may be supplied continuously, or part or the entirety of the vinyl monomer mixture (a) may be supplied separately. The procedure of continuously supplying part of the vinyl monomer mixture (a) means that part of the vinyl monomer mixture (a) is supplied at an initial stage and that the residual of the vinyl monomer mixture (a) is supplied continuously with time. The procedure of supplying the vinyl monomer mixture (a) separately means that the vinyl monomer mixture (a) is supplied at a time after the initial supply.

Any of various surface active agents may be added as the emulsifier in manufacturing the graft copolymer (A) by the emulsion polymerization method. Anionic surface active agents such as carboxylic acid salt type, sulfate type, and sulfonate type are especially preferably used as the various surface active agents. Two or more different types of the anionic surface active agents may be used in combination. Examples of the salts herein include alkali metal salts such as sodium salts, lithium salts and potassium salts, and ammonium salts.

Examples of the calboxylate salt emulsifier include caprylate salt, caprate salt, laurylate salt, myristate salt, palmitate salt, stearate salt, oleate salt, linoleate salt, linolenate salt, rosinate salt, behenate salt, and dialkylsulfonate salt.

Examples of the sulfate-type emulsifier include castor oil sulfate, lauryl alcohol sulfate, polyoxyethylene lauryl sulfate, polyoxyethylene alkyl ether sulfate, and polyoxyethylene alkyl phenyl ether sulfate.

Examples of the sulfonate-type emulsifier include dodecyl benzene sulfonates, alkyl naphthalene sulfonates, alkyl diphenyl ether disulfonates and naphthalene sulfonate condensates.

In manufacturing the graft copolymer (A) by the emulsion polymerization method, an initiator may be added as needed. The initiator used may be, for example, a peroxide, an azo compound or water-soluble potassium persulfate. The initiator may be two or more different types of these materials used in combination. The initiator used may be a redox polymerization initiator.

Examples of the peroxide include benzoyl peroxide, cumene hydroperoxide, dicumyl peroxide, diisopropylbenzene hydroperoxide, t-butyl hydroperoxide, t-butyl peroxyacetate, t-butyl peroxybenzonate, t-butyl isopropyl carbonate, di-t-butyl peroxide, t-butyl peroctoate, 1,1-bis(t-butylperoxy)-3,3,5-trimethylcyclohexane, 1,1-bis(t-butylperoxy)cyclohexane, and t-butyl peroxy-2-ethylhexanoate. Among these examples of the peroxide, cumene hydroperoxide, 1,1-bis(t-butylperoxy)-3,3,5-trimethylcyclohexane and 1,1-bis(t-butylperoxy)cyclohexane are especially preferably used.

Examples of the azo compound include azobisisobutyronitrile, azobis(2,4-dimethylvaleronitrile), 2-phenylazo-2,4-dimethyl-4-methoxyvaleronitrile, 2-cyano-2-propylazoformamide, 1,1'-azobis (cyclohexane-1-carbonitrile), azobis (4-methoxy-2,4-dimethylvaleronitrile), dimethyl 2,2'-azobis (isobutyrate), 1-t-butylazo-2-cyanobutane, and 2-t-butylazo-2-cyano-4-methoxy-4-methylpentane. Among these examples of the azo compound, 1,1'-azobis(cyclohexane-1-carbonitrile) is especially preferably used.

The amount of addition of the initiator used to manufacture the graft copolymer (A) is not specifically limited but is preferably not lower than 0.1 parts by mass and not higher than 0.5 parts by mass relative to the total of 100 parts by mass of the rubbery polymer (r) and the vinyl monomer mixture (a), in terms of the ease of adjustment of the number average molecular weight of the graft copolymer (A) to the range described above.

A chain transfer agent may be used in the process of manufacturing the graft copolymer (A). Using the chain transfer agent enables the number average molecular weight and the graft ratio of the graft copolymer (A) to be readily adjusted to desired ranges. Available examples of the chain transfer agent include: (i) mercaptans such as n-octyl mercaptan, t-dodecyl mercaptan, n-dodecyl mercaptan, n-tetradecyl mercaptan, and n-octadecyl mercaptan; and (ii) terpenes such as terpinolene. The chain transfer agent may be two or more different types of these materials used in combination. Among these examples of the chain transfer agent, n-octyl mercaptan and t-dodecyl mercaptan are used preferably.

The amount of addition of the chain transfer agent used to manufacture the graft copolymer (A) is not specifically limited. The amount of addition of the chain transfer agent used to manufacture the graft copolymer (A) is preferably not lower than 0.2 parts by mass and more preferably not lower than 0.4 parts by mass and is also preferably not higher than 0.7 parts by mass and more preferably not higher than 0.6 parts by mass relative to the total of 100 parts by mass of the rubbery polymer (r) and the vinyl monomer mixture (a), in terms of the ease of adjustment of the number average molecular weight, the dispersity and the graft ratio of the graft copolymer (A) to the ranges described above.

In manufacturing the graft copolymer (A) by emulsion polymerization, the polymerization temperature is not specifically limited but is preferably not lower than 40° C. and not higher than 70° C., in terms of the ease of adjustment of the number average molecular weight and the dispersity of the graft copolymer (A) to the ranges described above and in terms of the emulsion stability.

In manufacturing the graft copolymer (A) by the emulsion polymerization method, a general procedure adds a coagulant to the graft copolymer latex to collect the graft copolymer (A). An acid or a water-soluble salt is preferably used as the coagulant.

Examples of the acid usable as the coagulant include sulfuric acid, hydrochloric acid, phosphoric acid and acetic acid. Examples of the water-soluble salt usable as the coagulant include calcium chloride, magnesium chloride, barium chloride, aluminum chloride, magnesium sulfate, aluminum sulfate, aluminum ammonium sulfate, aluminum potassium sulfate, and aluminum sodium sulfate. The coagulant may be two or more different types of these materials used in combination. It is preferable that the emulsifier does not remain in the thermoplastic resin composition, in terms of improving the color tone of the molded product. Accordingly, a preferable procedure uses an alkali fatty acid salt as the emulsifier, performs acid coagulation and subsequently performs neutralization using an alkali such as sodium hydroxide to remove the emulsifier.

The vinyl copolymer (B) that constitutes the thermoplastic resin composition is obtained by copolymerization of a monomer mixture (b) including at least an aromatic vinyl monomer (b1), a (meth)acrylate monomer (b2) and a vinyl cyanide monomer (b3). The vinyl monomer mixture (b) may further contain another monomer that is copolymerizable with any of the above monomers (b1) to (b3).

The examples above as the aromatic vinyl monomer (a1) may be employed as the aromatic vinyl monomer (b1), and styrene is preferably used.

The content of the aromatic vinyl monomer (b1) included in the vinyl monomer mixture (b) is preferably not lower than 5% by mass, is more preferably not lower than 10% by mass and is furthermore preferably not lower than 20% by mass relative to a total of 100% by mass of the vinyl monomer mixture (b), in terms of enhancing the moldability of the thermoplastic resin composition and improving the rigidity of the molded product. The content of the aromatic vinyl monomer (b1) included in the vinyl monomer mixture (b) is, on the other hand, preferably not higher than 40% by mass, is more preferably not higher than 30% by mass and is furthermore preferably not higher than 25% by mass relative to the total of 100% by mass of the vinyl monomer mixture (b), in terms of improving the impact resistance and the transparency of the molded product.

The examples above as the (meth)acrylate monomer (a2) may be employed as the (meth)acrylate monomer (b2), and methyl (meth)acrylate is preferably used.

The content of the (meth)acrylate monomer (b2) included in the vinyl monomer mixture (b) is preferably not lower than 30% by mass, is more preferably not lower than 50% by mass and is furthermore preferably not lower than 60% by mass relative to the total of 100% by mass of the vinyl monomer mixture (b), in terms of improving the transparency of the molded product. The content of the (meth)acrylate monomer (b2) included in the vinyl monomer mixture (b) is, on the other hand, preferably not higher than 85% by mass, is more preferably not higher than 80% by mass and is furthermore preferably not higher than 75% by mass relative to the total of 100% by mass of the vinyl monomer mixture (b), in terms of further improving the transparency of the molded product.

The vinyl cyanide monomer (b3) used may be, for example, acrylonitrile, methacrylonitrile or ethacrylonitrile. The vinyl cyanide monomer (b3) used may be two or more different types of these materials. Among these examples of the vinyl cyanide monomer (b3), acrylonitrile is preferable, in terms of further improving the impact resistance of the molded product.

The content of the vinyl cyanide monomer (b3) included in the vinyl monomer mixture (b) is preferably not lower than 2% by mass and is more preferably not lower than 3% by mass relative to the total of 100% by mass of the vinyl monomer mixture (b), in terms of further improving the impact resistance of the molded product. The content of the vinyl cyanide monomer (b3) included in the vinyl monomer mixture (b) is, on the other hand, preferably not higher than 20% by mass, is more preferably not higher than 10% by mass and is furthermore preferably not higher than 5% by mass relative to the total of 100% by mass of the vinyl monomer mixture (b), in terms of improving the color tone of the molded product.

Another monomer that is copolymerizable with the aromatic vinyl monomer (b1), the (meth)acrylate monomer (b2) or the vinyl cyanide monomer (b3) is not specifically limited but may be any vinyl monomer other than the monomers (b1) to (b3) described above as long as this vinyl monomer does not damage the advantageous effects. This another monomer may be, for example, an unsaturated fatty acid, an acrylamide monomer or a maleimide monomer. Two or more different types of these materials may be contained as this another monomer. Examples of the unsaturated fatty acid include itaconic acid, maleic acid, fumaric acid, butanoic acid, acrylic acid and methacrylic acid. Examples of the acrylamide monomer include acrylamide, methacrylamide, and N-methylacrylamide. Examples of the maleimide monomer include N-methylmaleimide, N-ethylmaleimide, N-isopropylmaleimide, N-butylmaleimide, N-hexylmaleimide, N-octylmaleimide, N-dodecylmaleimide, N-cyclohexylmaleimide and N-phenylmaleimide.

The number average molecular weight of the vinyl copolymer (B) is preferably not less than 40,000 and is more preferably not less than 50,000. The number average molecular weight of the vinyl copolymer (B) that is not less than 40,000 further improves the impact resistance of the molded product. The number average molecular weight of the vinyl copolymer (B) is, on the other hand, preferably not greater than 100,000 and is more preferably not greater than 70,000. The number average molecular weight of the vinyl copolymer (B) that is not greater than 100,000 further enhances the moldability of the thermoplastic resin composition. The vinyl copolymer (B) having the number average molecular weight in the range of not less than 40,000 and not greater than 100,000 can be readily manufactured by, for example, using an initiator and a chain transfer agent described later and setting the polymerization temperature in a preferable range described later.

The number average molecular weight of the vinyl copolymer (B) may be determined by conversion from GPC chromatogram measurement of a solution of about 0.2% by mass that is prepared by dissolving about 0.03 g of the vinyl copolymer (B) in about 15 g of tetrahydrofuran, by using poly(methyl methacrylate) as a standard substance. The conditions of the GPC measurement are as follows:
measurement device: Waters 2695
column temperature: 40° C.
detector: R12414 (differential refractive index detector)
flow rate of carrier eluent: 0.3 ml/minute (solvent: tetrahydrofuran)
columns: TSK gel Super HZM-M (6.0 mm I.D.×15 cm) and TSK gel Super HZM-N (6.0 mm I.D.×15 cm) arranged in series (both manufactured by TOSOH Corporation).

A difference in refractive index between the vinyl copolymer (B) and the rubbery polymer (r) described later is preferably not higher than 0.03 and is more preferably not higher than 0.01. The difference in refractive index between the vinyl copolymer (B) and the rubbery polymer (r) that is not higher than 0.03 improves the transparency and the color tone of the molded product.

The refractive index of the vinyl copolymer (B) mainly depends on the composition of the vinyl monomers used as the raw materials. The refractive index can thus be in a desired range by appropriately selecting the types and the composition ratio of the vinyl monomers. The refractive index of the vinyl copolymer (B) may be estimated from the refractive indexes and the contents of the vinyl monomers. For example, in a styrene/acrylonitrile/methyl methacrylate copolymer, the refractive index of the vinyl copolymer (B) may be estimated by an expression:

$$nD(B)=(1.510 \times MA/100)+(1.595 \times MS/100)+(1.490 \times MM/100)$$

where nD(B) denotes the refractive index of the vinyl copolymer (B), MA denotes the content of acrylonitrile (% by mass), MS denotes the content of styrene (% by mass), MM denotes the content of methyl methacrylate (% by mass), 1.510 is the refractive index of polyacrylonitrile, 1.595 is the refractive index of polystyrene, and 1.490 is the refractive index of poly(methyl methacrylate). The refractive indexes of polyacrylonitrile, polystyrene and poly(methyl methacrylate) may be measured by an Abbe's refractometer.

The refractive index of the vinyl copolymer (B) may be measured by the Abbe's refractometer.

The manufacturing method of the vinyl copolymer (B) is not specifically limited, but a continuous bulk polymerization method or a continuous solution polymerization method is preferably used from the viewpoints of the transparency and the color tone of the molded product. The continuous bulk polymerization method herein denotes a method of continuously supplying a monomer mixture with time and continuously discharging a bulk-polymerized vinyl copolymer with time. The continuous solution polymerization method herein denotes a method of continuously supplying a monomer mixture and a solvent with time and continuously discharging a solution comprised of a solution-polymerized vinyl copolymer and the solvent with time.

Any procedure may be employed to manufacture the vinyl copolymer (B) by the continuous bulk polymerization method or the continuous solution polymerization method. For example, an employable procedure may polymerize the vinyl monomer mixture (b) in a polymerization tank and subsequently perform monomer removal (desolventization, devolatilization).

Any of mixing-type polymerization tanks equipped with a mixing blade or impeller such as a paddle blade, a turbine blade, a propeller blade, a blue margin blade, a multi-stage impeller, an anchor blade, a max blend impeller or double helical impeller and any of various tower-type reactors may be used as the polymerization tank. A multi-tube reactor, a kneader-type reactor or a twin screw extruder may also be used as a polymerization reactor (see, for example, Assessment of Polymer Manufacturing Process 10 "Assessment of Impact-Resistant Polystyrene", the Society of Polymer Science, Japan, Jan. 26, 1989).

In the process of manufacturing the vinyl copolymer (B), two or more units (tanks) of the polymerization tank or the polymerization reactor above may be used or two or more different types of the polymerization tank or the polymerization reactor may be used in combination as appropriate. In terms of reducing the dispersity of the vinyl copolymer (B), however, it is preferable to use two or less units (tanks)

of the polymerization tank or the polymerization reactor, and it is more preferable to use one-tank-type complete mixing polymerization tank.

A reaction mixture obtained by polymerization in the polymerization tank or in the polymerization reactor is generally subjected to a subsequent monomer removal process to remove monomers, a solvent, and other volatile components. A method employable for monomer removal may be, for example, a method of removing the volatile components from vents provided in a single screw extruder or a twin screw extruder during heating under ordinary pressure or under reduced pressure, a method of removing the volatile components by an evaporator equipped with a plate fin heater such as a centrifugal type, built in a drum, a method of removing the volatile components by a thin film evaporator such as a centrifugal type, or a method of removing the volatile components by using a multi-tube heat exchanger for preheating, foaming and flushing into a vacuum tank. Among the methods employable for monomer removal, it is especially preferable to employ the method of removing the volatile components by the single screw extruder or the twin screw extruder equipped with the vents.

An initiator or a chain transfer agent may be used in the process of manufacturing the vinyl copolymer (B). Examples of the initiator and the chain transfer agent are those above with regard to the manufacturing method of the graft copolymer (A).

The amount of addition of the initiator used to manufacture the vinyl copolymer (B) is not specifically limited but is preferably not lower than 0.01 parts by mass and not higher than 0.03 parts by mass relative to a total of 100 parts by mass of the vinyl monomer mixture (b), in terms of the ease of adjustment of the number average molecular weight of the vinyl copolymer (B) to the range described above.

The amount of addition of the chain transfer agent used to manufacture the vinyl copolymer (B) is not specifically limited but is preferably not lower than 0.05 parts by mass and not higher than 0.30 parts by mass relative to a total of 100 parts by mass of the vinyl monomer mixture (b), in terms of the ease of adjustment of the number average molecular weight of the vinyl copolymer (B) to the range described above.

In manufacturing the vinyl copolymer (B) by the continuous bulk polymerization method or the continuous solution polymerization method, the polymerization temperature is not specifically limited but is preferably not lower than 120° C. and not higher than 140° C., in terms of the ease of adjustment of the number average molecular weight of the vinyl copolymer (B) to the range described above.

In manufacturing the vinyl copolymer (B) by the continuous solution polymerization method, the amount of the solvent is preferably not higher than 30% by mass and is more preferably not higher than 20% by mass in the polymerization solution, from the viewpoint of the productivity. From the viewpoint of polymerization stability, ethyl benzene or methyl ethyl ketone is preferably used as the solvent, and ethyl benzene is especially preferable.

The thermoplastic resin composition is preferably obtained by mixing not less than 10 parts by mass and not greater than 60 parts by mass of the graft copolymer (A) with not less than 40 parts by mass and not greater than 90 parts by mass of the vinyl copolymer (B) relative to a total of 100 parts by mass of the graft copolymer (A) and the vinyl copolymer (B). Blending the graft copolymer (A) of not less than 10 parts by mass with the vinyl copolymer (B) of not greater than 90 parts by mass suppresses reduction of the impact resistance of the molded product. It is more preferable to blend not less than 20 parts by mass of the graft copolymer (A) with not greater than 80 parts by mass of the vinyl copolymer (B) relative to the total of 100 parts by mass of the graft copolymer (A) and the vinyl copolymer (B). Blending the graft copolymer (A) of not greater than 60 parts by mass with the vinyl copolymer (B) of not less than 40 parts by mass suppresses deterioration of the moldability and suppresses deterioration of the transparency and the color tone, while suppressing an increase in melt viscosity of the thermoplastic resin composition. It is more preferable to blend not greater than 50 parts by mass of the graft copolymer (A) with not less than 50 parts by mass of the vinyl copolymer (B) relative to the total of 100 parts by mass of the graft copolymer (A) and the vinyl copolymer (B).

In the thermoplastic resin composition, an acetone insoluble component (C) does not practically contain a vinyl cyanide monomer-derived unit and preferably does not contain the vinyl cyanide monomer-derived unit at all. The expression herein that the acetone insoluble component (C) does not practically contain the vinyl cyanide monomer-derived unit means that there is no peak at 2240 cm$^{-1}$ that is attributed to C≡N stretch derived from a vinyl cyanide monomer in FT-IR analysis with regard to the acetone insoluble component (C) described later. The acetone insoluble component (C) that practically contains the vinyl cyanide monomer-derived unit causes significant deterioration of the transparency and the color tone of the molded product.

In the thermoplastic resin composition, an acetone soluble component (D) contains the vinyl cyanide monomer-derived unit, and the content of the vinyl cyanide monomer-derived unit is not lower than 2% by mass and not higher than 20% by mass relative to 100% by mass of the acetone soluble component (D). The expression herein that the acetone soluble component (D) contains the vinyl cyanide monomer-derived unit means that there is a peak of 122 ppm that is attributed to carbon of C≡N derived from a vinyl cyanide monomer in $^{13}$C-NMR analysis with regard to the acetone soluble component (D) described later. The acetone soluble component (D) containing the vinyl cyanide monomer-derived unit improves the impact resistance of the molded product.

The content of the vinyl cyanide monomer-derived unit that is lower than 2% by mass relative to 100% by mass of the acetone soluble component (D) reduces the impact resistance of the molded product. The content of the vinyl cyanide monomer-derived unit that is higher than 20% by mass relative to 100% by mass of the acetone soluble component (D), on the other hand, causes significant deterioration of the transparency and the color tone of the molded product.

The presence or the absence of a peak in FT-IR of the vinyl cyanide monomer-derived unit and the content of the vinyl cyanide monomer-derived unit in the acetone insoluble component (C) of the thermoplastic resin composition may be determined by a procedure below. The procedure first adds 80 ml of acetone to about 1 g of the thermoplastic resin composition, refluxes the solution in a hot water bath at 70° C. for 3 hours, centrifuges this solution at 8000 rpm (10000 G) for 40 minutes and filters an insoluble substance to obtain the acetone insoluble component (C). The procedure also concentrates the filtrate by a rotary evaporator to obtain the acetone soluble component (D). The acetone insoluble component (C) and the acetone soluble component (D) thus obtained are respectively dried under reduced pressure at 80° C. for 5 hours.

The procedure performs FT-IR analysis of the obtained acetone insoluble component (C) with regard to a film having a thickness of 30±5 μm produced by hot press set at 230° C. to determine the presence or the absence of a peak of the vinyl cyanide monomer-derived unit and the content of the vinyl cyanide monomer-derived unit from an intensity ratio of the following peaks appearing in a spectral chart of FT-IR by using a calibration curve that is provided in advance. The following describes a relationship between the units and the peaks:

styrene monomer-derived unit (a1): a peak at 1605 $cm^{-1}$ attributed to vibration of a benzene nucleus;

methyl methacrylate monomer-derived unit (a2): a peak at 3460 $cm^{-1}$ as an overtone peak of a peak at 1730 $cm^{-1}$ attributed to stretching vibration of an ester carbonyl group C=O;

acrylonitrile monomer-derived unit (a3): a peak at 2240 $cm^{-1}$ attributed to C≡N stretch; and rubbery polymer (r): a peak at 960 $cm^{-1}$ attributed to C=C.

The presence or the absence of a peak in NMR of the vinyl cyanide monomer-derived unit and the content of the vinyl cyanide monomer-derived unit in the acetone soluble component (D) of the thermoplastic resin composition may, on the other hand, be determined by a procedure below.

The procedure first dissolves about 1 g of the obtained acetone soluble component (D) in 5 ml of deuterated chloroform (chloroform-d) and performs $^{13}$C-NMR to to determine the presence or the absence of a peak of the vinyl cyanide monomer-derived unit and the content of the vinyl cyanide monomer-derived unit from an intensity ratio of the following peaks appearing in a spectral chart of NMR. For example, in a styrene/methyl methacrylate/acrylonitrile copolymer, the procedure calculates fractions (mol %) from respective peak intensities below and converts the calculated fractions (mol %) into a mass ratio. The following describes a relationship between the units and the fractions (mol %):

styrene monomer-derived units (a1) and (b1): [peak intensity of 128 ppm]/5;

methyl methacrylate monomer-derived units (a2) and (b2): [peak intensity of 177 ppm];

acrylonitrile monomer-derived units (a3) and (b3): [peak intensity of 122 ppm].

Measurement conditions of $^{13}$C-NMR are:
device: JNM-GX 270 Model manufactured by JEOL Ltd.
measurement technique: gated decoupling
observation frequency: 67.9402 MHz
solvent: chloroform-d
concentration: 1 g/5 ml (sample/chloroform-d)
chemical shift reference: $Me_4Si$
temperature: ambient temperature
observation width: 20000 Hz
data points: 65536
flip angle: 45 degrees (10 μs)
pulse delay time: 16.0 s
cumulative number: 12000 times
sample rotation speed: 13.0 Hz.

For example, the method of setting the composition of the graft copolymer (A) and the vinyl copolymer (B) to the preferable range described above may be employed to provide such a thermoplastic resin composition that the acetone insoluble component (C) does not practically contain the vinyl cyanide monomer-derived unit and that the acetone soluble component (D) contains the vinyl cyanide monomer-derived unit and has its content in the range described above.

In the thermoplastic resin composition, it is preferable that a dimethyl sulfoxide soluble component (E) contains the vinyl cyanide monomer-derived unit and has a ratio of lower than 1% as a rate of the number of triads having all the positions occupied by the vinyl cyanide monomer-derived unit to the total number of triads having the center position occupied by the vinyl cyanide monomer-derived unit. The expression herein that the dimethyl sulfoxide soluble component (E) contains the vinyl cyanide monomer-derived unit means that there is a peak of 122 ppm that is attributed to carbon of C N derived from a vinyl cyanide monomer in $^{13}$C-NMR analysis with regard to the dimethyl sulfoxide soluble component (E) described later. It is preferable that the dimethyl sulfoxide soluble component (E) contains the vinyl cyanide monomer-derived unit since this improves the impact resistance of the molded product.

The term "triad" indicates three sequential monomer-derived units in a copolymer obtained by copolymerization of monomers. The triad of the vinyl cyanide monomer-derived unit means that three vinyl cyanide monomer-derived units are sequentially introduced into a copolymer. A general formula of the triad of the vinyl cyanide monomer-derived unit is expressed by Chemical Formula (2):

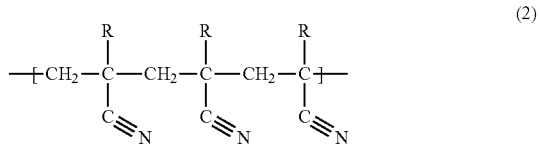

(2)

where R denotes a hydrogen atom or an alkyl group.

The expression that "the dimethyl sulfoxide soluble component (E) has the ratio of lower than 1% as the rate of the number of triads having all the positions occupied by the vinyl cyanide monomer-derived unit to the total number of triads having the center position occupied by the vinyl cyanide monomer-derived unit" means that the rate of the number of triads having the center position occupied by the vinyl cyanide monomer-derived unit and the respective adjacent positions also occupied by the vinyl cyanide monomer-derived unit to the total number of triads having the center position occupied by the vinyl cyanide monomer-derived unit, among all the triads included in the dimethyl sulfoxide soluble component (E) is lower than 1%.

The dimethyl sulfoxide soluble component (E) containing the vinyl cyanide monomer-derived unit improves the impact resistance of the molded product. The dimethyl sulfoxide soluble component (E) having the ratio of lower than 1% as the rate of the number of triads having all the positions occupied by the vinyl cyanide monomer-derived unit to the total number of triads having the center position occupied by the vinyl cyanide monomer-derived unit improves the transparency and the color tone of the molded product.

The triad of the vinyl cyanide monomer-device unit is a segment expressed by Chemical Formula (2). When a copolymer having such a segment is exposed to high temperature, an intermolecular cyclization reaction that causes coloring and that is shown by Chemical Formula (3) is likely to proceed. Accordingly, the dimethyl sulfoxide soluble component (E) having the ratio of lower than 1% as the rate of the number of triads having all the positions occupied by the vinyl cyanide monomer-derived unit to the total number of triads having the center position occupied by the vinyl cyanide monomer-derived unit suppresses such coloring:

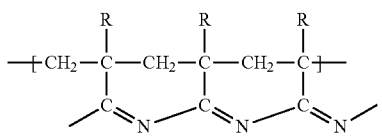

(3)

where R denotes a hydrogen atom or an alkyl group.

The presence or the absence of a peak in NMR of the vinyl cyanide monomer-derived unit and the rate of the triad of the vinyl cyanide monomer-derived unit in the dimethyl sulfoxide soluble component (E) may be determined by a procedure below. The procedure first adds 50 ml of deuterated dimethyl sulfoxide (DMSO-$d_6$) to about 10 g of the thermoplastic resin composition, refluxes the solution in a hot water bath at 70° C. for 3 hours, subsequently centrifuges this solution at 8000 rpm (10000 G) for 40 minutes and then filters an insoluble substance to obtain the dimethyl sulfoxide soluble component (E). The procedure subsequently checks the presence or the absence of a peak of 122 ppm that is attributed to carbon of C≡N in the vinyl cyanide monomer-derived unit appearing in a spectral chart of NMR by using the dimethyl sulfoxide soluble component (E) as a sample. The procedure also takes advantage of a slight difference in signal shift of carbon of C≡N in the vinyl cyanide monomer-derived unit appearing in $^{13}$C-NMR due to a difference in adjacent monomer species to determine the rate of triads of carbon of in the vinyl cyanide monomer-derived unit from a signal integrated value, and calculates, in the unit of mol %, the rate of the triad of the vinyl cyanide monomer-derived unit to the total number of triads having the center position occupied by the vinyl cyanide monomer-derived unit. Examples of the triad having the center position occupied by the vinyl cyanide monomer-derived unit include -A-A-A-, -A-A-S-, -A-A-M-, -S-A-S-, -M-A-M-, and -S-A-M- (where "S" represents the styrene monomer-derived unit, "M" represents the methyl methacrylate monomer-derived unit, and "A" represents the acrylonitrile monomer-derived unit).

The rate (mol %) of the triad of the vinyl cyanide monomer-derived unit to the total number of triads having the center position occupied by the vinyl cyanide monomer-derived unit is [peak intensity of -A-A-A-]/[peak intensities of -A-A-A-, -A-A-S-, -A-A-M-, -S-A-S-, -M-A-M-, and -S-A-M-]×100.

The following gives the combinations of triads and the peak positions:
-A-A-A-: 119.4 to 120.0 ppm;
-A-A-S-, -A-A-M-, -S-A-S-, -M-A-M-, and -S-A-M-: 120.0 to 123.8 ppm.

Measurement conditions of $^{13}$C-NMR are:
device: ECZR-600 Model manufactured by JEOL Ltd.
measurement technique: single $^{13}$C pulse with inverse gated $^1$H decoupling
probe: Super COOL open type
observation frequency: 150.9 MHz
solvent: DMSO-$d_6$
concentration: 100 mg/0.6 ml (sample/DMSO-$d_6$)
chemical shift reference: Me$_4$Si
temperature: 110° C.
observation width: 37900 Hz
data points: 32768
flip angle: 45 degrees (5.25 µs)
pulse delay time: 5.0 s
cumulative number: 12988 times.

In the thermoplastic resin composition, the acetone insoluble component (C) does not practically contain the vinyl cyanide monomer-derived unit. The acetone soluble component (D) of the thermoplastic resin composition contains the vinyl cyanide monomer-derived unit and has the content of the vinyl cyanide monomer-device unit that is not lower than 2% by mass and not higher than 20% by mass relative to 100% by mass of the acetone soluble component (D). The configuration that the graft copolymer (A) does not practically contain the vinyl cyanide monomer (a3) and that only the vinyl copolymer (B) contains the vinyl cyanide-base monomer (b3) improves the color tone and the transparency, while maintaining the impact resistance.

In the process of manufacturing the graft copolymer (A) by the emulsion polymerization method, the vinyl cyanide monomer (a3) has the higher solubility in water compared to the solubilities of the aromatic vinyl monomer (a1) and the (meth)acrylate monomer (a2). Accordingly, in the process of manufacturing the graft copolymer (A) by the emulsion polymerization method, the vinyl cyanide monomer (a3) that is not taken into micelle emulsion is present in water. We found that polymerization of only the vinyl cyanide monomer (a3) present in water increases the rate of the triad of the vinyl cyanide monomer-derived unit and that this increase causes deterioration of the color tone. Accordingly, we significantly decreased the rate of the triad of the vinyl cyanide monomer-derived unit in our thermoplastic resin composition.

Our thermoplastic resin composition may further include the following components in a range that does not damage the advantageous effects: inorganic fillers such as glass fibers, glass powders, glass beads, glass flakes, alumina, alumina fibers, carbon fibers, graphite fibers, stainless steel fibers, whiskers, potassium titanate fibers, wollastonite, asbestos, hard clay, calcined clay, talc, kaolin, mica, calcium carbonate, magnesium carbonate, aluminum oxide and minerals; impact modifiers such as silicone compounds; antioxidants such as hindered phenols, sulfur-containing compounds and phosphorus-containing organic compounds; thermal stabilizers such as phenols and acrylates; ultraviolet absorbers such as benzotriazole, benzophenone and salicylates; hindered amine-based light stabilizers; lubricants and plasticizers such as higher fatty acids, acid esters, acid amides and higher alcohols; mold releasing agents such as montanoic acid and its salts, esters and half esters, stearyl alcohol, stearamide and ethylene waxes; various flame retardants; flame retardant promoters; color protection agents such as phosphites and hydrophosphites; neutralizers such as phosphoric acid, monosodium phosphate, maleic anhydride, and succinic anhydride; nucleating agents; antistatic agents such as amines, sulfonates and polyethers; coloring agents such as carbon black, pigments and dyes; and bluing agents.

The following describes a manufacturing method of the thermoplastic resin composition. The thermoplastic resin composition may be obtained by melt blending the graft copolymer (A) and the vinyl copolymer (B) described above as well as other components as needed. A more preferable manufacturing method of the thermoplastic resin composition is a method of continuously bulk polymerizing the vinyl copolymer (B) and further continuously melt kneading the graft copolymer (A) and other components as needed.

FIG. 1 is a schematic diagram illustrating a manufacturing apparatus of the thermoplastic resin composition preferably used. As shown in FIG. 1, the manufacturing apparatus of the thermoplastic resin composition includes a reaction tank 1 provided to produce the vinyl copolymer (B), a preheater 2 provided to heat the obtained vinyl copolymer (B) to a predetermined temperature, and a twin screw extruder-type monomer removal machine 3 linked in this sequence. In the manufacturing apparatus of the thermoplastic resin composition, a twin screw extruder-type feeder 5 provided to supply the graft copolymer (A) is further connected as a side feeder with the twin screw extruder-type monomer removal machine 3. The reaction tank 1 is provided with a mixing impeller (helical ribbon impeller) 7, and the twin screw extruder-type monomer removal machine 3 has vent holes 8 for removal of volatile components such as unreacted monomers.

The reaction product continuously supplied from the reaction tank 1 is heated to the predetermined temperature in the preheater 2 and is subsequently supplied to the twin screw extruder-type monomer removal machine 3. In the twin screw extruder-type monomer removal machine 3, the volatile components such as unreacted monomers are generally removed from the vent holes 8 to outside of the system at the temperature of about 150 to 280° C. under ordinary pressure or under reduced pressure. Such removal of the volatile components is generally performed until the volatile components are reduced to a predetermined amount, for example, not higher than 10% by mass or more preferably not higher than 5% by mass. It is preferable that the removed volatile components are again supplied to the reaction tank 1.

The graft copolymer (A) is supplied from the twin screw extruder-type feeder 5 through an opening provided at a position close to a downstream side in the middle of the twin screw extruder-type monomer removal machine 3. It is preferable that the twin screw extruder-type feeder 5 is provided with a heating device to supply the graft copolymer (A) in a semi-molten state or in a molten state to the twin screw extruder-type monomer removal machine 3. This ensures the favorable mixing state. The heating temperature of the graft copolymer (A) is generally 100 to 220° C. The twin screw extruder-type feeder 5 may be, for example, a twin screw extruder-type feeder configured to include a screw, a cylinder and a screw drive unit and to provide the cylinder with heating and cooling functions.

At a position where the twin screw extruder-type monomer removal machine 3 is connected with the twin screw extruder-type feeder 5, the content of the unreacted monomers is preferably reduced to be not higher than 10% by mass and is more preferably reduced to be not higher than 5% by, mass to suppress thermal degradation of the rubber component due to a subsequent operation of removing the unreacted monomers.

In a melt kneading zone 4 that is a downstream region after the position where the twin screw extruder-type monomer removal machine 3 is connected with the twin screw extruder-type feeder 5, the vinyl copolymer (B) and the graft copolymer (A) are melt kneaded, and the obtained thermoplastic resin composition is discharged from a discharge opening 6 to outside of the system. It is preferable that a water inlet 9 is provided in the melt kneading zone 4 to add a predetermined amount of water. The added water and the volatile components such as the unreacted monomers are removed from a final vent hole 10 provided on a further downstream side to outside of the system.

The thermoplastic resin composition may be molded by any molding method. Examples of the employable molding method include injection molding, extrusion molding, inflation molding, blow molding, vacuum forming, compression molding and gas assist molding. Among them, injection molding is preferably employed. In the injection molding, a cylinder temperature is preferably not lower than 210° C. and not higher than 320° C., and a mold temperature is preferably not lower than 30° C. and not higher than 80° C.

The thermoplastic resin composition may be widely used as molded products of any shapes. Examples of the molded product include films, sheets, fibers, cloths, unwoven fabrics, injection molded products, extrusion molded products, vacuum/pressure molded products, blow molded products and composites with other materials.

The thermoplastic resin composition has significantly high transparency and good color tone, as well as excellent impact resistance and is thus usefully applicable to household electric appliances, communication equipment, general merchandise, and medical equipment.

EXAMPLES

The following describes the aspects of this disclosure more in detail with reference to Examples. This disclosure is, however, not limited to the examples. Evaluation methods performed in Examples are described first.

(1) Mass average particle size of rubbery polymer

Latex of the rubbery polymer (r) was diluted with and dispersed in an aqueous medium, and a particle size distribution was measured by a laser diffraction scattering particle size distribution measurement device "LS 13 320" (manufactured by Beckman Coulter, Inc.) The mass average particle size of the rubbery polymer (r) was then calculated from the measured particle size distribution.

(2) Refractive index of rubbery polymer (r)

A deposit of the rubbery polymer (r) was obtained by adding 10 ml of emulsified rubber latex to 150 ml of methanol with stirring at 300 rpm and subsequently adding 20 ml of sulfuric acid adjusted to 10% by mass. A film having a thickness of 30±5 μm was produced by drying the deposit of the rubbery polymer (r) under reduced pressure at 60° C. for 5 hours and subsequently heating and pressurizing the dried deposit of the rubbery polymer (r) by hot press set at 230° C. The refractive index of the obtained film as a measurement sample was measured by using an Abbe's refractometer after dropwise addition of a small amount of 1-bromonaphthalene under the conditions of sodium lamp D line as a light source and the measurement temperature of 23° C.

(3) Number average molecular weight

The number average molecular weight was determined by conversion using poly(methyl methacrylate) as a standard substance from a GPC chromatogram measured by using a solution of about 0.2% by mass obtained by dissolving about 0.03 g of a sample of the acetone soluble component of the graft copolymer (A) or the vinyl copolymer (B) in about 15 g of tetrahydrofuran. The following conditions were employed for GPC measurement:
measurement device: Waters 2695
column temperature: 40° C.
detector: RI2414 (differential refractive index detector)
flow rate of carrier eluent: 0.3 ml/minute (solvent: tetrahydrofuran)
columns: TSK gel Super HZM-M (6.0 mm I.D.×15 cm) and TSK gel Super HZM-N (6.0 mm×15 cm) arranged in series (both manufactured by TOSOH Corporation).

(4) Graft ratio of graft copolymer (A)

After addition of 80 ml of acetone to about 1 g of the graft copolymer (A), the solution was refluxed in a hot water bath at 70° C. for 3 hours. An acetone insoluble component was obtained by centrifuging this solution at 8000 rpm (10000 G) for 40 minutes and subsequently filtering an insoluble substance. The obtained acetone insoluble component was dried under reduced pressure at 80° C. for 5 hours. The mass of the dried acetone insoluble component (expressed as n in an expression below) was measured, and the graft ratio was calculated according to the expression below:

graft ratio(%)={[(n)−((m)×X/100)]/[(m)×X/100]}×100 where m denotes the sample mass of the graft copolymer (A) used, and X denotes the content of the rubbery polymer (% by mass) of the graft copolymer (A).

(5) Presence or absence of peak in FT-IR of vinyl cyanide monomer-derived unit and content of vinyl cyanide monomer-derived unit in acetone insoluble component (C) of thermoplastic resin composition After addition of 80 ml of acetone to about 1 g of the thermoplastic resin composition, the solution was refluxed in a hot water bath at 70° C. for 3 hours. The acetone insoluble component (C) was obtained by centrifuging this solution at 8000 rpm (10000 G) for 40 minutes and subsequently filtering an insoluble substance. The acetone soluble component (D) was obtained by concentrating the filtrate by a rotary evaporator. The acetone insoluble component (C) and the acetone soluble component (D) thus obtained were respectively dried under reduced pressure at 80° C. for 5 hours.

FT-IR analysis of the obtained acetone insoluble component (C) was performed with regard to a film having a thickness of 30±5 μm produced by hot press set at 230° C. The FT-IR analysis determines the presence or the absence of a peak of the vinyl cyanide monomer-derived unit and the content of the vinyl cyanide monomer-derived unit from an intensity ratio of the following peaks appearing in a spectral chart of FT-IR by using a calibration curve provided in advance. The following describes a relationship between the units and the peaks:

styrene monomer-derived unit (a1): a peak at 1605 $cm^{-1}$ attributed to vibration of a benzene nucleus;
methyl methacrylate monomer-derived unit (a2): a peak at 3460 $cm^{-1}$ as an overtone peak of a peak at 1730 $cm^{-1}$ attributed to stretching vibration of an ester carbonyl group C=O;
acrylonitrile monomer-derived unit (a3): a peak at 2240 $cm^{-1}$ attributed to C≡N stretch; and rubbery polymer (r): a peak at 960 $cm^{-1}$ attributed to C=C.

Figure 2:
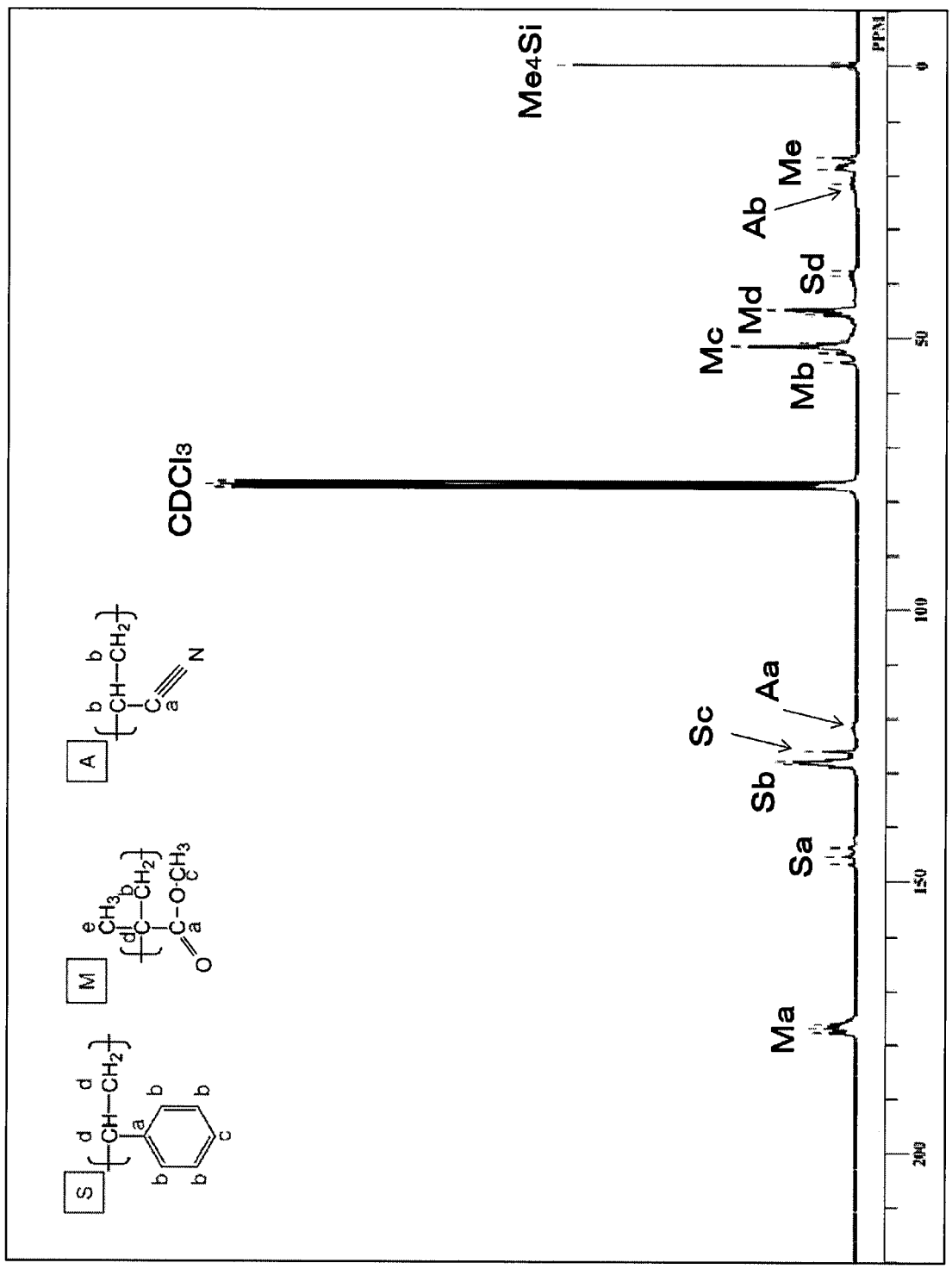
FIG. 2 is a diagram illustrating one example of a $^{13}$C-NMR spectral chart of a styrene/methyl methacrylate/acrylonitrile copolymer.

(6) Presence or absence of peak in NMR of vinyl cyanide monomer-derived unit and content of vinyl cyanide monomer-derived unit in acetone soluble component (D) of thermoplastic resin composition About 1 g of the acetone soluble component (D) of the thermoplastic resin composition obtained by the method described above in (5) was dissolved in 5 ml of deuterated chloroform (chloroform-d). $^{13}$C-NMR was then performed to determine the presence or the absence of a peak of the vinyl cyanide monomer-derived unit and the content of the vinyl cyanide monomer-derived unit from an intensity ratio of the following peaks appearing in a spectral chart of NMR. For example, in a styrene/methyl methacrylate/acrylonitrile copolymer, a molar ratio was calculated from respective peak intensities below and was then converted into a mass ratio. FIG. 2 shows one example of a $^{13}$C-NMR spectral chart of a styrene/methyl methacrylate/acrylonitrile copolymer. Capital letters S, M and A shown in FIG. 2 respectively represent a styrene monomer-derived unit, a methyl methacrylate monomer-derived unit and an acrylonitrile monomer-derived unit, and small letters a, b, c, d and e represent carbons constituting the respective monomer-derived units. The combinations of the capital letters and the small letters indicate attribution of the respective peaks in FIG. 2:

styrene monomer-derived units (a1) and (b1): [peak intensity of 128 ppm]/5;
methyl methacrylate monomer-derived units (a2) and (b2): [peak intensity of 177 ppm];
acrylonitrile monomer-derived units (a3) and (b3): [peak intensity of 122 ppm].

Measurement conditions of $^{13}$C-NMR are:
device: JNM-GX 270 Model manufactured by JEOL Ltd.
measurement technique: gated decoupling
observation frequency: 67.9402 MHz
solvent: chloroform-d
concentration: 1 g/5 ml (sample/chloroform-d)
chemical shift reference: $Me_4Si$
temperature: ambient temperature
observation width: 20000 Hz
data points: 65536
flip angle: 45 degrees (10 μs)
pulse delay time: 16.0 s
cumulative number: 12000 times
sample rotation speed: 13.0 Hz.

(7) Refractive indexes of graft component (acetone insoluble component) of graft copolymer (A) and vinyl copolymer (B)

A film of the acetone insoluble component of the graft copolymer (A) was produced by the method described above in (5). A film of the vinyl copolymer (B) was also produced under similar conditions to those described in (5). The refractive indexes of the obtained films were measured by using an Abbe's refractometer after dropwise addition of a small amount of 1-bromonaphthalene under the following conditions:
light source: sodium lamp D line
measurement temperature: 23° C.

(8) Presence or absence of peak of vinyl cyanide monomer-derived unit and rate of triad of vinyl cyanide monomer-derived unit in dimethyl sulfoxide soluble component (E) of thermoplastic resin composition The dimethyl sulfoxide soluble component (E) was obtained by adding 50 ml of deuterated dimethyl sulfoxide (DMSO-$d_6$) to about 10 g of the thermoplastic resin composition, refluxing the solution in a hot water bath at 70° C. for 3 hours, subsequently centrifuging this solution at 8000 rpm (10000 G) for 40 minutes and then filtering an insoluble substance. The presence or the absence of a peak of 122 ppm attributed to carbon of C≡N in the vinyl cyanide monomer-derived unit appearing in a spectral chart of NMR was checked by using the dimethyl sulfoxide soluble component (E) as a sample. By taking advantage of a slight difference in signal shift of carbon of C≡N in the vinyl cyanide monomer-derived unit appearing in $^{13}$C-NMR due to a difference in adjacent monomer species, the rate of triads of carbon of C≡N in the vinyl cyanide monomer-derived unit was determined from a signal integrated value. The rate of the triad of the vinyl cyanide monomer-derived unit to the total number of triads having the center position occupied by the vinyl cyanide monomer-derived unit was then calculated in the unit of mol %. FIG. 3 is an exemplary enlarged view showing carbons of C≡N in a $^{13}$C-NMR spectrum chart of a styrene/methyl methacrylate/acrylonitrile copolymer. Capital letters S, M and A shown in FIG. 3 respectively represent a styrene monomer-derived unit, a methyl methacrylate monomer-derived unit and an acrylonitrile monomer-derived unit. The rate (mol %) of the triad of the vinyl cyanide monomer-derived unit to the total number of triads having the center position occupied by the vinyl cyanide monomer-derived unit is [peak intensity of -A-A-A-]/[peak intensities of -A-A-A-, -A-A-S-, -A-A-M-, -S-A-S-, -M-A-M-, and -S-A-M-]×100.

The following gives the combinations of triads and the peak positions:
-A-A-A-: 119.4 to 120.0 ppm;
-A-A-S-, -A-A-M-, -S-A-S-, -M-A-M-, and -S-A-M-: 120.0 to 123.8 ppm.

Measurement conditions of $^{13}$C-NMR are:
device: ECZR-600 Model manufactured by JEOL Ltd.
measurement technique: single $^{13}$C pulse with inverse gated $^1$H decoupling
probe: Super COOL open type
observation frequency: 150.9 MHz
solvent: DMSO-d$_6$
concentration: 100 mg/0.6 ml (sample/DMSO-d$_6$)
chemical shift reference: Me$_4$Si
temperature: 110° C.
observation width: 37900 Hz
data points: 32768
flip angle: 45 degrees (5.25 μs)
pulse delay time: 5.0 s
cumulative number: 12988 times.

(9) Transparency (Haze, Total Light Transmittance)

Pellets of a thermoplastic resin composition obtained in each of the Examples and Comparative Examples were dried in a hot air drier at 80° C. for 3 hours and then immediately molded to a rectangular plate-like molded product having a thickness of 3 mm by a molding machine SE-50DU manufactured by Sumitomo Heavy Industries, Ltd. with the cylinder temperature set to 230° C. The haze and the total light transmittance of the obtained rectangular plate-like molded product were measured by using a direct reading haze meter manufactured by TOYO SEIKI CO., Ltd.

(10) Color Tone (YI Value, L Value)

Pellets of a thermoplastic resin composition obtained in each of the Examples and Comparative Examples were dried in a hot air drier at 80° C. for 3 hours and then immediately molded to a rectangular plate-like molded product having a thickness of 3 mm by a molding machine SE-50DU manufactured by Sumitomo Heavy Industries, Ltd. with the cylinder temperature set to 230° C. The YI value and the L value were measured with regard to five samples of each obtained rectangular plate-like molded product in conformity with JIS K7103 (established in 1971), and their number average values were calculated.

(11) Impact Resistance (Charpy Impact Strength)

Pellets of a thermoplastic resin composition obtained in each of the Examples and Comparative Examples were dried in a hot air drier at 80° C. for 3 hours and then immediately molded to a dumbbell test piece having a thickness of 4 mm by a molding machine SE-50DU manufactured by Sumitomo Heavy Industries, Ltd. with the cylinder temperature set to 230° C. The Charpy impact strength was measured with regard to five samples of each obtained dumbbell test piece by a method in conformity with ISO 179, and its number average value was calculated. Production Example 1 Graft Copolymer (A-1)

Fifty parts by mass (solid content conversion) of polybutadiene latex (rubber mass average particle size of 0.30 refractive index of 1.516), 130 parts by mass of pure water, 0.4 parts by mass of sodium laurate, 0.2 parts by mass of glucose, 0.2 parts by mass of sodium pyrophosphate and 0.01 parts by mass of iron (II) sulfate were placed in a 5-liter four neck flask equipped with a stirring blade, were subjected to nitrogen substitution, and were controlled to the temperature of 60° C. A monomer mixture including 3 parts by mass of styrene, 12 parts by mass of methyl methacrylate and 0.07 parts by mass of t-dodecyl mercaptan was initially added to the above mixture with stirring over 45 minutes.

Subsequently, an initiator mixture including 0.3 parts by mass of cumene hydroperoxide, 1.6 parts by mass of sodium laurate as an emulsifier and 25 parts by mass of pure water was continuously added dropwise over 5 hours. Simultaneously, a monomer mixture including 2 parts by mass of styrene, 8 parts by mass of methyl methacrylate, and 0.08 parts by mass of t-dodecyl mercaptan was continuously added dropwise over 50 minutes, and a monomer mixture including 7.5 parts by mass of styrene, 17.5 parts by mass of methyl methacrylate, and 0.17 parts by mass of t-dodecyl mercaptan was then continuously added dropwise over 130 minutes. After the dropwise addition of the monomer mixtures, polymerization was concluded by keeping the mixture for 1 hour. Obtained graft copolymer latex was solidified by 1.5% by mass of sulfuric acid, neutralized with sodium hydroxide, washed, centrifuged, and dried so that a graft copolymer (A-1) in a powdery form (monomer ratio: 25% by mass of styrene and 75% by mass of methyl methacrylate) was obtained. An acetone insoluble component of the obtained graft copolymer (A-1) had the refractive index of 1.516 and had a difference of 0.000 from the refractive index of the rubbery polymer. The graft ratio was 50%. The number average molecular weight of an acetone soluble component was 40,000.

Production Example 2 Graft Copolymer (A-2)

A graft copolymer (A-2) in a powdery form (monomer ratio: 25% by mass of styrene and 75% by mass of methyl methacrylate) was obtained by a procedure similar to the procedure of Production Example 1, except using polybutadiene latex having a rubber average particle size of 0.13 μm and a refractive index of 1.516, in place of the polybutadiene latex having the rubber average particle size of 0.30 μm and the refractive index of 1.516. An acetone insoluble component of the obtained graft copolymer (A-2) had the refractive index of 1.516 and had a difference of 0.000 from the refractive index of the rubbery polymer. The graft ratio was 48%. The number average molecular weight of an acetone soluble component was 40,000.

Production Example 3 Graft Copolymer (A-3)

A graft copolymer (A-3) in a powdery form (monomer ratio: 25% by mass of styrene and 75% by mass of methyl methacrylate) was obtained by a procedure similar to the procedure of Production Example 1, except using polybutadiene latex having a rubber average particle size of 0.13 μm and a refractive index of 1.516, in place of the polybutadiene latex having the rubber average particle size of 0.42 μm and the refractive index of 1.516. An acetone insoluble component of the obtained graft copolymer (A-3) had the refractive index of 1.516 and had a difference of 0.000 from the refractive index of the rubbery polymer. The graft ratio was 55%. The number average molecular weight of an acetone soluble component was 40,000.

Production Example 4 Graft Copolymer (A-4)

Fifty parts by mass (solid content conversion) of styrene/butadiene latex (monomer ratio: 5% by mass of styrene and 95% by mass of butadiene, rubber mass average particle size of 0.32 μm, refractive index of 1.520), 130 parts by mass of pure water, 0.4 parts by mass of sodium laurate, 0.2 parts by mass of glucose, 0.2 parts by mass of sodium pyrophosphate and 0.01 parts by mass of iron (II) sulfate were placed in a 5-liter four neck flask equipped with a stirring blade, were subjected to nitrogen substitution, and were controlled to the temperature of 60° C. A monomer mixture including 4.3 parts by mass of styrene, 10.7 parts by mass of methyl methacrylate and 0.07 parts by mass of t-dodecyl mercaptan was initially added to the above mixture with stirring over 45 minutes.

Subsequently, an initiator mixture including 0.3 parts by mass of cumene hydroperoxide, 1.6 parts by mass of sodium laurate as an emulsifier and 25 parts by mass of pure water was continuously added dropwise over 5 hours. Simultaneously, a monomer mixture including 2.8 parts by mass of styrene, 7.2 parts by mass of methyl methacrylate, and 0.08 parts by mass of t-dodecyl mercaptan was continuously added dropwise over 50 minutes, and a monomer mixture including 7.1 parts by mass of styrene, 35.8 parts by mass of methyl methacrylate, and 0.17 parts by mass of t-dodecyl mercaptan was then continuously added dropwise over 130 minutes. After the dropwise addition of the monomer mixtures, polymerization was concluded by keeping the mixture for 1 hour. Obtained graft copolymer latex was solidified by 1.5% by mass of sulfuric acid, neutralized with sodium hydroxide, washed, centrifuged, and dried so that a graft copolymer (A-4) in a powdery form (monomer ratio: 28.4% by mass of styrene and 71.6% by mass of methyl methacrylate) was obtained. An acetone insoluble component of the obtained graft copolymer (A-4) had the refractive index of 1.521 and had a difference of 0.001 from the refractive index of the rubbery polymer. The graft ratio was 51%. The number average molecular weight of an acetone soluble component was 39,000.

Production Example 5 Graft Copolymer (A-5)

Fifty parts by mass (solid content conversion) of styrene/butadiene latex (monomer ratio: 10% by mass of styrene and 90% by mass of butadiene, rubber mass average particle size of 0.32 μm, refractive index of 1.524), 130 parts by mass of pure water, 0.4 parts by mass of sodium laurate, 0.2 parts by mass of glucose, 0.2 parts by mass of sodium pyrophosphate and 0.01 parts by mass of iron (II) sulfate were placed in a 5-liter four neck flask equipped with a stirring blade, were subjected to nitrogen substitution, and were controlled to the temperature of 60° C. A monomer mixture including 4.9 parts by mass of styrene, 10.1 parts by mass of methyl methacrylate and 0.07 parts by mass of t-dodecyl mercaptan was initially added to the above mixture with stirring over 45 minutes.

Subsequently, an initiator mixture including 0.3 parts by mass of cumene hydroperoxide, 1.6 parts by mass of sodium laurate as an emulsifier and 25 parts by mass of pure water was continuously added dropwise over 5 hours. Simultaneously, a monomer mixture including 3.2 parts by mass of styrene, 6.8 parts by mass of methyl methacrylate, and 0.08 parts by mass of t-dodecyl mercaptan was continuously added dropwise over 50 minutes, and a monomer mixture including 8.1 parts by mass of styrene, 16.9 parts by mass of methyl methacrylate, and 0.17 parts by mass of t-dodecyl mercaptan was then continuously added dropwise over 130 minutes. After the dropwise addition of the monomer mixtures, polymerization was concluded by keeping the mixture for 1 hour. Obtained graft copolymer latex was solidified by 1.5% by mass of sulfuric acid, neutralized with sodium hydroxide, washed, centrifuged, and dried so that a graft copolymer (A-5) in a powdery faun (monomer ratio: 32.4% by mass of styrene and 67.6% by mass of methyl methacrylate) was obtained. An acetone insoluble component of the obtained graft copolymer (A-5) had the refractive index of 1.525 and had a difference of 0.001 from the refractive index of the rubbery polymer. The graft ratio was 51%. The number average molecular weight of an acetone soluble component was 38,000.

Production Example 6 Graft Copolymer (A-6)

Fifty parts by mass (solid content conversion) of styrene/butadiene latex (monomer ratio: 25% by mass of styrene and 75% by mass of butadiene, rubber mass average particle size of 0.33 μm, refractive index of 1.536), 130 parts by mass of pure water, 0.4 parts by mass of sodium laurate, 0.2 parts by mass of glucose, 0.2 parts by mass of sodium pyrophosphate and 0.01 parts by mass of iron (II) sulfate were placed in a 5-liter four neck flask equipped with a stirring blade, were subjected to nitrogen substitution, and were controlled to the temperature of 60° C. A monomer mixture including 6.6 parts by mass of styrene, 8.4 parts by mass of methyl methacrylate and 0.07 parts by mass of t-dodecyl mercaptan was initially added to the above mixture with stirring over 45 minutes.

Subsequently, an initiator mixture including 0.3 parts by mass of cumene hydroperoxide, 1.6 parts by mass of sodium laurate as an emulsifier and 25 parts by mass of pure water was continuously added dropwise over 5 hours. Simultaneously, a monomer mixture including 4.3 parts by mass of styrene, 5.7 parts by mass of methyl methacrylate, and 0.08 parts by mass of t-dodecyl mercaptan was continuously added dropwise over 50 minutes, and a monomer mixture including 11 parts by mass of styrene, 14 parts by mass of methyl methacrylate, and 0.17 parts by mass of t-dodecyl mercaptan was then continuously added dropwise over 130 minutes. After the dropwise addition of the monomer mixtures, polymerization was concluded by keeping the mixture for 1 hour. Obtained graft copolymer latex was solidified by 1.5% by mass of sulfuric acid, neutralized with sodium hydroxide, washed, centrifuged, and dried so that a graft copolymer (A-6) in a powdery form (monomer ratio: 43.8% by mass of styrene and 56.2% by mass of methyl methacrylate) was obtained. An acetone insoluble component of the obtained graft copolymer (A-6) had the refractive index of 1.538 and had a difference of 0.002 from the refractive index of the rubbery polymer. The graft ratio was 52%. The number average molecular weight of an acetone soluble component was 37,000.

Production Example 7 Graft Copolymer (A-7)

Fifty parts by mass (solid content conversion) of polybutadiene latex (rubber mass average particle size of 0.30 μm, refractive index of 1.516), 130 parts by mass of pure water, 0.4 parts by mass of sodium laurate, 0.2 parts by mass of glucose, 0.2 parts by mass of sodium pyrophosphate and 0.01 parts by mass of iron (II) sulfate were placed in a 5-liter four neck flask equipped with a stirring blade, were subjected to nitrogen substitution, and were controlled to the temperature of 60° C. A monomer mixture including 3.6 parts by mass of styrene, 0.6 parts by mass of acrylonitrile, 10.8 parts by mass of methyl methacrylate and 0.15 parts by mass of t-dodecyl mercaptan was initially added to the above mixture with stirring over 45 minutes.

Subsequently, an initiator mixture including 0.3 parts by mass of cumene hydroperoxide, 1.6 parts by mass of sodium laurate as an emulsifier and 25 parts by mass of pure water was continuously added dropwise over 5 hours. Simultaneously, a monomer mixture including 8.4 parts by mass of styrene, 1.4 parts by mass of acrylonitrile, 25.2 parts by mass of methyl methacrylate, and 0.36 parts by mass of t-dodecyl mercaptan was continuously added dropwise over 5 hours. After the dropwise addition of the monomer mixture, polymerization was concluded by keeping the mixture for 1 hour. Obtained graft copolymer latex was solidified by 1.5% by mass of sulfuric acid, neutralized with sodium hydroxide, washed, centrifuged, and dried so that a graft copolymer (A-7) in a powdery form (monomer ratio: 24% by mass of styrene, 4% by mass of acrylonitrile, and 72% by mass of methyl methacrylate) was obtained. An acetone insoluble component of the obtained graft copolymer (A-7) had the refractive index of 1.517 and had a difference of 0.001 from the refractive index of the rubbery polymer. The graft ratio was 47%. The number average molecular weight of an acetone soluble component was 34,000.

The production conditions and the measurement results of the graft copolymers described above are shown in Table 1.

polymerization rate of a polymerization reaction mixture at an outlet of the complete mixing-type polymerization tank was controlled to 65±3%.

The procedure subsequently preheated the polymerization reaction mixture by the single screw extruder-type preheater, supplied the preheated polymerization reaction mixture to the twin screw extruder-type monomer removal machine, and collected unreacted monomers by evaporation under reduced pressure from vent holes of the twin screw extruder-type monomer removal machine. The collected unreacted monomers are continuously flowed back to the complete mixing-type polymerization tank. The procedure used the twin screw extruder-type feeder to supply t-butyl hydroxytoluene as a phenolic stabilizer at a rate of 0.225 kg/hour, tri(nonylphenyl) phosphite as a phosphorus stabilizer at a rate of 0.225 kg/hour, and the graft copolymer (A-1) produced in Production Example 1 in a semi-molten state at a

TABLE 1

| Graft Copolymer | Rubber-based Polymer (r) | | | Vinyl-based Monomer Mixture (a) | | | | | Acetone Insoluble | Acetone Soluble |
| | Type of Rubber | Refractive Index | Content of Rubber-based Polymer (% by mass) | Content of Vinyl-based Monomers (% by mass) | Supply Composition | | | Graft Ratio (%) | Component (Graft Component) Refractive Index | Component Number Average Molecular Weight |
| | | | | | (a1) (% by mass) | (a2) (% by mass) | (a3) (% by mass) | | | |
| --- | --- | --- | --- | --- | --- | --- | --- | --- | --- | --- |
| A-1 | Polybutadiene rubber | 1.516 | 50 | 50 | 25 | 75 | 0 | 50 | 1.516 | 40,000 |
| A-2 | Polybutadiene rubber | 1.516 | 50 | 50 | 25 | 75 | 0 | 48 | 1.516 | 40,000 |
| A-3 | Polybutadiene rubber | 1.516 | 50 | 50 | 25 | 75 | 0 | 55 | 1.516 | 40,000 |
| A-4 | Styrene/butadiene rubber | 1.520 | 50 | 50 | 28.4 | 71.6 | 0 | 51 | 1.521 | 39,000 |
| A-5 | Styrene/butadiene rubber | 1.524 | 50 | 50 | 32.4 | 67.6 | 0 | 51 | 1.525 | 38,000 |
| A-6 | Styrene/butadiene rubber | 1.536 | 50 | 50 | 43.8 | 56.2 | 0 | 52 | 1.538 | 37,000 |
| A-7 | Polybutadiene rubber | 1.516 | 50 | 50 | 24 | 72 | 4 | 47 | 1.517 | 34,000 |

Example 1

A vinyl copolymer and a thermoplastic resin composition were manufactured by a procedure described below by using a continuous bulk polymerization device including a 2 m$^3$ complete mixing-type polymerization tank equipped with a capacitor for evaporation and dry distillation of monomer vapor and with a helical ribbon impeller; a single screw extruder-type preheater; a twin screw extruder-type monomer removal machine; and a twin screw extruder-type feeder connected with a barrel portion of the monomer removal machine at a position of one third the length of the barrel portion away from a downstream (outlet)-side end.

The procedure continuously supplied a monomer mixture (b) including 23.5 parts by mass of styrene, 4.5 parts by mass of acrylonitrile, 72 parts by mass of methyl methacrylate, 0.26 parts by mass of n-octyl mercaptan, and 0.015 parts by mass of 1,1-bis(t-butylperoxy)cyclohexane at a rate of 150 kg/hour to the complete mixing-type polymer tank and performed continuous bulk polymerization of the monomer mixture (b) with keeping the polymerization temperature at 130° C. and the inner tank pressure at 0.08 MPa. The rate of 50.5 kg/hour to the styrene/acrylonitrile/methyl methacrylate copolymer that had an apparent polymerization rate of not lower than 99% at the position of one third the full length of the twin screw extruder-type monomer removal machine from the downstream-side end and that was supplied at a rate of 150 kg/hour to be melt kneaded with the styrene-acrylonitrile/methyl methacrylate copolymer in the twin screw extruder-type monomer removal machine. In the melt kneading process, the procedure supplied water at a rate of 2 kg/hour at a position of one sixth of the full length of the twin screw extruder-type monomer removal machine from the downstream-side end. This supplied water and other volatile components were evaporated under reduced pressure to be removed from a vent hole placed on a further downstream side of the twin screw extruder-type monomer removal machine. The procedure then discharged a melt kneaded substance in strands and cut the strands by a cutter to obtain pellets of a thermoplastic resin composition.

The procedure also stopped the supply from the twin screw extruder-type feeder and discharged and sampled the styrene/acrylonitrile/methyl methacrylate copolymer. The properties of the obtained styrene/acrylonitrile/methyl methacrylate copolymer and the obtained thermoplastic resin composition were evaluated by the methods described above.

Example 2

Pellets of a thermoplastic resin composition were obtained by a procedure similar to the procedure of Example 1, except that the supply rate of the graft copolymer (A-1) produced in Production Example 1 was set to 84.4 kg/hour.

Example 3

Pellets of a thermoplastic resin composition were obtained by a procedure similar to the procedure of Example 1, except that the graft copolymer (A-2) produced in Production Example 2 was used in place of the graft copolymer (A-1) produced in Production Example 1 and that the supply rate of the graft copolymer (A-2) was set to 60.7 kg/hour.

Example 4

Pellets of a thermoplastic resin composition were obtained by a procedure similar to the procedure of Example 1, except that the graft copolymer (A-3) produced in Production Example 3 was used in place of the graft copolymer (A-1) produced in Production Example 1.

Example 5

Pellets of a thermoplastic resin composition were obtained by a procedure similar to the procedure of Example 1, except that the composition of the monomer mixture (b) had 22% by mass of styrene, 15% by mass of acrylonitrile and 63% by mass of methyl methacrylate.

Example 6

Pellets of a thermoplastic resin composition were obtained by a procedure similar to the procedure of Example 1, except that the composition of the monomer mixture (b) had 27% by mass of styrene, 4.5% by mass of acrylonitrile, and 68.5% by mass of methyl methacrylate and that the graft copolymer (A-4) produced in Production Example 4 was used in place of the graft copolymer (A-1) produced in Production Example 1.

Comparative Example 1

Pellets of a thermoplastic resin composition were obtained by a procedure similar to the procedure of Example 1, except that the composition of the monomer mixture (b) had 25% by mass of styrene and 75% by mass of methyl methacrylate.

Comparative Example 2

Pellets of a thermoplastic resin composition were obtained by a procedure similar to the procedure of Example 1, except that the composition of the monomer mixture (b) had 31.5% by mass of styrene, 4.5% by mass of acrylonitrile, and 64% by mass of methyl methacrylate and that the graft copolymer (A-5) produced in Production Example 5 was used in place of the graft copolymer (A-1) produced in Production Example 1.

Comparative Example 3

Pellets of a thermoplastic resin composition were obtained by a procedure similar to the procedure of Example 1, except that the composition of the monomer mixture (b) had 43% by mass of styrene, 4.5% by mass of acrylonitrile, and 52.5% by mass of methyl methacrylate and that the graft copolymer (A-6) produced in Production Example 6 was used in place of the graft copolymer (A-1) produced in Production Example 1.

Comparative Example 4

Pellets of a thermoplastic resin composition were obtained by a procedure similar to the procedure of Example 1, except that the graft copolymer (A-7) produced in Production Example 7 was used in place of the graft copolymer (A-1) produced in Production Example 1.

Comparative Example 5

Pellets of a thermoplastic resin composition were obtained by a procedure similar to the procedure of Example 1, except that the composition of the monomer mixture (b) had 20% by mass of styrene, 25% by mass of acrylonitrile, and 55% by mass of methyl methacrylate.

The compositions of the thermoplastic resin compositions are shown in Table 2, and the evaluation results are shown in Table 3.

TABLE 2

| | Vinyl-based Copolymer (B) | | | | | | | Graft Copolymer (A) | | |
| --- | --- | --- | --- | --- | --- | --- | --- | --- | --- | --- |
| | Supply Composition of Vinyl-based Monomers | | | Number Average | | | | | | |
| | (b1) (% by mass) | (b2) (% by mass) | (b3) (% by mass) | Molecular Weight | Refractive Index | Supply Rate (kg/hour) | Amount (parts by mass) | Type | Supply Rate (kg/hour) | Amount (parts by mass) |
| EX 1 | 23.5 | 72 | 4.5 | 65,000 | 1.516 | 150 | 74.8 | A-1 | 50.5 | 25.2 |
| EX 2 | 23.5 | 72 | 4.5 | 65,000 | 1.516 | 150 | 64 | A-1 | 84.4 | 36 |
| EX 3 | 23.5 | 72 | 4.5 | 65,000 | 1.516 | 150 | 71.2 | A-2 | 60.7 | 28.8 |
| EX 4 | 23.5 | 72 | 4.5 | 65,000 | 1.516 | 150 | 74.8 | A-3 | 50.5 | 25.2 |
| EX 5 | 22 | 63 | 15 | 65,000 | 1.516 | 150 | 74.8 | A-1 | 50.5 | 25.2 |
| EX 6 | 27 | 68.5 | 4.5 | 65,000 | 1.519 | 150 | 74.8 | A-4 | 50.5 | 25.2 |
| COMP EX 1 | 25 | 75 | 0 | 65,000 | 1.516 | 150 | 74.8 | A-1 | 50.5 | 25.2 |
| COMP EX 2 | 31.5 | 64 | 4.5 | 64,000 | 1.524 | 150 | 71.2 | A-5 | 50.5 | 25.2 |
| COMP EX 3 | 43 | 52.5 | 4.5 | 63,000 | 1.536 | 150 | 55 | A-6 | 50.5 | 25.2 |
| COMP EX 4 | 23.5 | 72 | 4.5 | 65,000 | 1.516 | 150 | 74.8 | A-7 | 50.5 | 25.2 |
| COMP EX 5 | 20 | 55 | 25 | 67,000 | 1.516 | 150 | 71.2 | A-1 | 50.5 | 25.2 |

TABLE 3

| | Rubber-based Polymer (r) | | Acetone Insoluble Component (C) | | Acetone Soluble Component (D) | | Dimethyl Sulfoxide Soluble Component (E) | | Transparency | | Color Tone | | Impact Resistance Charpy Impact Strength |
|---|---|---|---|---|---|---|---|---|---|---|---|---|---|
| | | | | | | | | | Haze (%) | Total Light Transmittance (%) | YI Value | L Value | (kJ/m²) |
| | *1 | *2 | *3 | *4 | *5 | *6 | *7 | *8 | | | | | |
| EX 1 | 1.516 | 0.30 | Absent | 0 | Present | 4 | Present | <0.1 | 1.8 | 92 | 11 | 96 | 10 |
| EX 2 | 1.516 | 0.30 | Absent | 0 | Present | 3 | Present | <0.1 | 2.4 | 91 | 13 | 95 | 13 |
| EX 3 | 1.516 | 0.13 | Absent | 0 | Present | 4 | Present | <0.1 | 1.2 | 93 | 12 | 96 | 9 |
| EX 4 | 1.516 | 0.42 | Absent | 0 | Present | 4 | Present | <0.1 | 2.8 | 90 | 14 | 95 | 14 |
| EX 5 | 1.516 | 0.30 | Absent | 0 | Present | 14 | Present | 0.8 | 2 | 92 | 13 | 95 | 13 |
| EX 6 | 1.520 | 0.32 | Absent | 0 | Present | 4 | Present | <0.1 | 2.6 | 91 | 13 | 95 | 9 |
| COMP EX 1 | 1.516 | 0.30 | Absent | 0 | Absent | 0 | Absent | 0 | 1.8 | 92 | 10 | 96 | 6 |
| COMP EX 2 | 1.524 | 0.32 | Absent | 0 | Present | 4 | Present | <0.1 | 3 | 89 | 15 | 94 | 9 |
| COMP EX 3 | 1.536 | 0.33 | Absent | 0 | Present | 4 | Present | <0.1 | 3.5 | 89 | 16 | 94 | 9 |
| COMP EX 4 | 1.516 | 0.30 | Present | 2 | Present | 5 | Present | 5 | 3.5 | 89 | 17 | 94 | 9 |
| COMP EX 5 | 1.516 | 0.30 | Absent | 0 | Present | 23 | Present | 3 | 3.5 | 88 | 19 | 93 | 14 |

*1 Refractive Index
*2 Mass Average Particle Size(μm)
*3 Presence or Absence of Vinyl Cyanide-based Monomer-derived Unit
*4 Content of Vinyl Cyanide-based Monomer-derived Unit (% by mass)
*5 Presence or Absence of Vinyl Cyanide-based Monomer-derived Unit
*6 Content of Vinyl Cyanide-based Monomer-derived Unit (% by mass)
*7 Presence or Absence of Vinyl Cyanide-based Monomer-derived Unit
*8 Rate of Triad of Vinyl Cyanide-based Monomer-derived Unit (%)

As shown by the evaluation results of Example 1 to 6, the thermoplastic resin composition provided a molded product that has significantly high transparency and good color tone, as well as excellent impact resistance.

Comparative Example 1, on the other hand, had poor impact resistance since the monomer mixture (b) did not contain the vinyl cyanide monomer (b3) and the content of the vinyl cyanide monomer-derived unit of the acetone soluble component (D) was lower than 2% by mass. Comparative Examples 2 and 3 had poor transparency and color tone since the rubbery polymer (r) had the refractive index of higher than 1.520. Comparative Example 4 had poor transparency and color tone since the monomer mixture (a) practically contained the vinyl cyanide monomer (a3) and the acetone insoluble component (C) practically contained the vinyl cyanide monomer-derived unit. Comparative Example 5 had poor transparency and color tone since the content of the vinyl cyanide monomer (b3) of the acetone soluble component (D) was higher than 20% by mass.

INDUSTRIAL APPLICABILITY

The thermoplastic resin composition and the molded product are widely used for applications such as household electric appliances, communication equipment, general merchandise, and medical equipment.

The invention claimed is:

1. A thermoplastic resin composition, comprising:
  a graft copolymer (A) obtained by graft copolymerization of a monomer mixture (a) including at least an aromatic vinyl monomer (a1) and a (meth)acrylate monomer (a2), but does not contain a vinyl cyanide monomer (a3), in the presence of a rubbery polymer (r) having a refractive index of not lower than 1.510 and not higher than 1.520; and
  a vinyl copolymer (B) obtained by copolymerization of a monomer mixture (b) including at least an aromatic vinyl monomer (b1), a (meth)acrylate monomer (b2), and a vinyl cyanide monomer (b3), wherein
  an acetone insoluble component (C) of the thermoplastic resin composition does not contain a vinyl cyanide monomer-derived unit,
  an acetone soluble component (D) of the thermoplastic resin composition contains the vinyl cyanide monomer-derived unit,
  a content of the vinyl cyanide monomer-derived unit is not lower than 2% by mass and not higher than 14% by mass relative to 100% by mass of the acetone soluble component (D),
  a dimethyl sulfoxide soluble component (E) of the thermoplastic resin composition contains the vinyl cyanide monomer-derived unit,
  in the dimethyl sulfoxide soluble component (E), a rate of a triad having all positions occupied by the vinyl cyanide monomer-derived unit to a total number of triads having a center position occupied by the vinyl cyanide monomer-device unit is lower than 1%, and
  a difference in refractive index between a graft acetone insoluble component of the graft copolymer (A) and the rubbery polymer (r) is not higher than 0.03 and a difference in refractive index between the vinyl copolymer (B) and the rubbery polymer (r) is not higher than 0.03.

2. The thermoplastic resin composition according to claim 1, wherein the rubbery polymer (r) is polybutadiene.

3. The thermoplastic resin composition according to claim 1, wherein the rubbery polymer (r) has a mass average particle size of not less than 0.15 μm and not greater than 0.4 μm.

4. A method of manufacturing a thermoplastic resin composition, comprising:
  a process of obtaining a graft copolymer (A) by graft copolymerization of a monomer mixture (a) including at least an aromatic vinyl monomer (a1) and a (meth)acrylate monomer (a2), but does not contain a vinyl cyanide monomer (a3), in the presence of a rubbery polymer (r) having a refractive index of not lower than 1.510 and not higher than 1.520;

a process of obtaining a vinyl copolymer (B) by copolymerization of a monomer mixture (b) including at least an aromatic vinyl monomer (b1), a (meth)acrylate monomer (b2), and a vinyl cyanide monomer (b3); and a process of blending the graft copolymer (A) with the vinyl copolymer (B), wherein an acetone insoluble component (C) of the thermoplastic resin composition does not contain a vinyl cyanide monomer-derived unit, an acetone soluble component (D) of the thermoplastic resin composition contains the vinyl cyanide monomer-derived unit, a content of the vinyl cyanide monomer-derived unit is not lower than 2% by mass and not higher than 14% by mass relative to 100% by mass of the acetone soluble component (D), a dimethyl sulfoxide soluble component (E) of the thermoplastic resin composition contains the vinyl cyanide monomer-derived unit, in the dimethyl sulfoxide soluble component (E), a rate of a triad having all positions occupied by the vinyl cyanide monomer-derived unit to a total number of triads having a center position occupied by the vinyl cyanide monomer-device unit is lower than 1%, and a difference in refractive index between a graft acetone insoluble component of the graft copolymer (A) and the rubbery polymer (r) is not higher than 0.03 and a difference in refractive index between the vinyl copolymer (B) and the rubbery polymer (r) is not higher than 0.03.

5. The manufacturing method of the thermoplastic resin composition according to claim 4, wherein the graft copolymer (A) is manufactured by an emulsion polymerization method.

6. The manufacturing method of the thermoplastic resin composition according to claim 4, wherein the vinyl copolymer (B) is manufactured by a continuous bulk polymerization method or by a continuous solution polymerization method.

7. A molded product obtained by molding the thermoplastic resin composition according to claim 1.

8. A method of manufacturing a molded product, comprising:

the method according to claim 4; and a process of molding the thermoplastic resin composition to provide a molded product.

9. The thermoplastic resin composition according to claim 1, wherein the vinyl copolymer (B) is obtained by copolymerizing the vinyl monomer mixture (b) including a content of the (meth)acrylate monomer (b2) of not lower than 68.5% by mass and not higher than 85% by mass.

10. The thermoplastic resin composition according to claim 1, wherein the vinyl copolymer (B) is obtained by copolymerizing the vinyl monomer mixture (b) including a content of the (meth)acrylate monomer (b2) of not lower than 68.5% by mass and not higher than 75% by mass.

11. The thermoplastic resin composition according to claim 1, wherein the vinyl copolymer (B) is obtained by copolymerizing the vinyl monomer mixture (b) including a content of the vinyl cyanide monomer (b3) of not lower than 3% by mass and not higher than 20% by mass.

12. The thermoplastic resin composition according to claim 4, wherein the vinyl copolymer (B) is obtained by copolymerizing the vinyl monomer mixture (b) including a content of the (meth)acrylate monomer (b2) of not lower than 68.5% by mass and not higher than 85% by mass.

13. The thermoplastic resin composition according to claim 4, wherein the vinyl copolymer (B) is obtained by copolymerizing the vinyl monomer mixture (b) including a content of the (meth)acrylate monomer (b2) of not lower than 68.5% by mass and not higher than 75% by mass.

14. The thermoplastic resin composition according to claim 4, wherein the vinyl copolymer (B) is obtained by copolymerizing the vinyl monomer mixture (b) including a content of the vinyl cyanide monomer (b3) of not lower than 3% by mass and not higher than 20% by mass.

* * * * *